United States Patent
Yamane et al.

(10) Patent No.: US 7,079,771 B2
(45) Date of Patent: Jul. 18, 2006

(54) WAVELENGTH MULTIPLEXING TRANSMISSION APPARATUS AND WAVELENGTH DEMULTIPLEXING RECEPTION APPARATUS

(75) Inventors: Kazuo Yamane, Kawasaki (JP); Takashi Tsuda, Kawasaki (JP); Yumiko Kawasaki, Kawasaki (JP); Satoru Okano, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 686 days.

(21) Appl. No.: 10/272,995

(22) Filed: Oct. 18, 2002

(65) Prior Publication Data

US 2003/0030867 A1    Feb. 13, 2003

Related U.S. Application Data

(60) Continuation of application No. 09/922,777, filed on Aug. 7, 2001, now Pat. No. 6,496,288, which is a division of application No. 09/115,914, filed on Jul. 15, 1998, now Pat. No. 6,295,147.

(30) Foreign Application Priority Data

Oct. 17, 1997  (JP)  ................................. 9-285846

(51) Int. Cl.
    H04J 14/02    (2006.01)
    H04B 10/04   (2006.01)
    H01S 3/00    (2006.01)
(52) U.S. Cl. .................. 398/94; 398/79; 398/95; 398/197; 372/38.07
(58) Field of Classification Search ............... 398/79, 398/82, 93, 94, 95, 195, 196, 197; 372/29.01, 372/29.011, 29.02, 33, 38.01, 38.07
See application file for complete search history.

(56) References Cited

U.S. PATENT DOCUMENTS

| | | | |
|---|---|---|---|
| 5,305,134 A * | 4/1994 | Tsushima et al. | 398/91 |
| 5,418,869 A | 5/1995 | Seike et al. | 385/24 |
| 5,589,969 A | 12/1996 | Taga et al. | 359/124 |

(Continued)

FOREIGN PATENT DOCUMENTS

EP    607 029 A2    7/1994

(Continued)

OTHER PUBLICATIONS

JP 04185132, Jul. 2, 1992, Patent Abstracts of Japan (Abstract only).
Decision of Rejection in Japanese Office Action.

*Primary Examiner*—M. R. Sedighian
(74) *Attorney, Agent, or Firm*—Staas & Halsey LLP

(57) ABSTRACT

The invention provides a wavelength multiplexing transmission apparatus includes a plurality of optical signal outputting sections for outputting optical signals having different wavelengths from each other, and a wavelength multiplexing section for wavelength multiplexing the optical signals outputted from the optical signal outputting sections and sending out a resulting optical signal. Each of the optical signal outputting sections includes a transmission light source driven by an electric signal for outputting an optical signal of a predetermined wavelength, and a wavelength filter capable of passing therethrough and sending out only an optical signal of the predetermined wavelength to be outputted from the transmission light source to prevent a wavelength drift of the optical signal outputted from the transmission light source. A variation of the wavelength of the transmission light source is detected, and the transmission light source is shut down in order to prevent otherwise possible crosstalk with another channel and prevent a further influence of the same.

3 Claims, 21 Drawing Sheets

U.S. PATENT DOCUMENTS

| | | | |
|---|---|---|---|
| 5,594,577 A | 1/1997 | Majima et al. | 359/124 |
| 5,603,570 A | 2/1997 | Shimizu | 374/100 |
| 5,646,763 A | 7/1997 | Misaizu et al. | 359/187 |
| 5,696,859 A | 12/1997 | Onaka et al. | 385/24 |
| 5,781,572 A | 7/1998 | Tahara et al. | 372/34 |
| 5,898,719 A | 4/1999 | Ryu | 372/32 |
| 5,920,414 A * | 7/1999 | Miyachi et al. | 398/14 |
| 5,936,987 A | 8/1999 | Ohishi et al. | 372/38 |
| 6,040,931 A * | 3/2000 | Miyazaki et al. | 398/23 |
| 6,134,253 A | 10/2000 | Munks et al. | 372/38 |
| 6,204,945 B1 | 3/2001 | Iwata et al. | 359/124 |
| 6,496,288 B1 * | 12/2002 | Yamane et al. | 398/23 |

FOREIGN PATENT DOCUMENTS

| | | |
|---|---|---|
| EP | 844 751 A2 | 5/1998 |
| JP | 60022840 | 2/1985 |
| JP | 04185132 | 7/1992 |
| JP | 6-085783 | 3/1994 |
| JP | 7-1131111 | 5/1995 |
| JP | 7-249817 | 9/1995 |
| JP | 8-237203 | 8/1996 |
| JP | 9-130332 | 5/1997 |
| JP | 8-321825 | 12/1999 |

* cited by examiner

F I G. 20
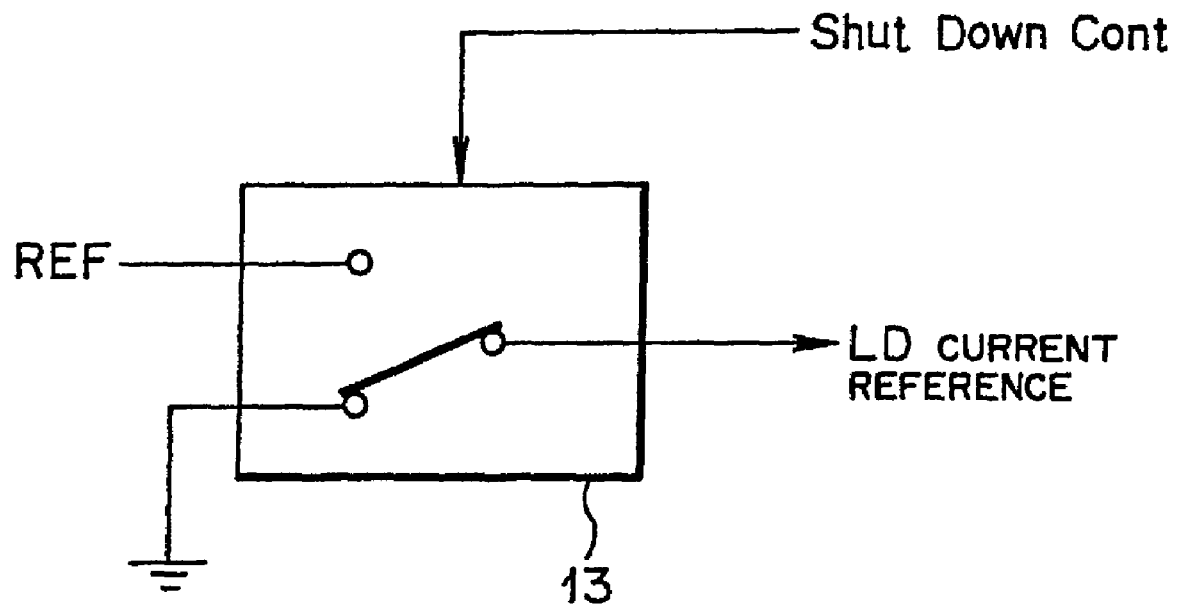

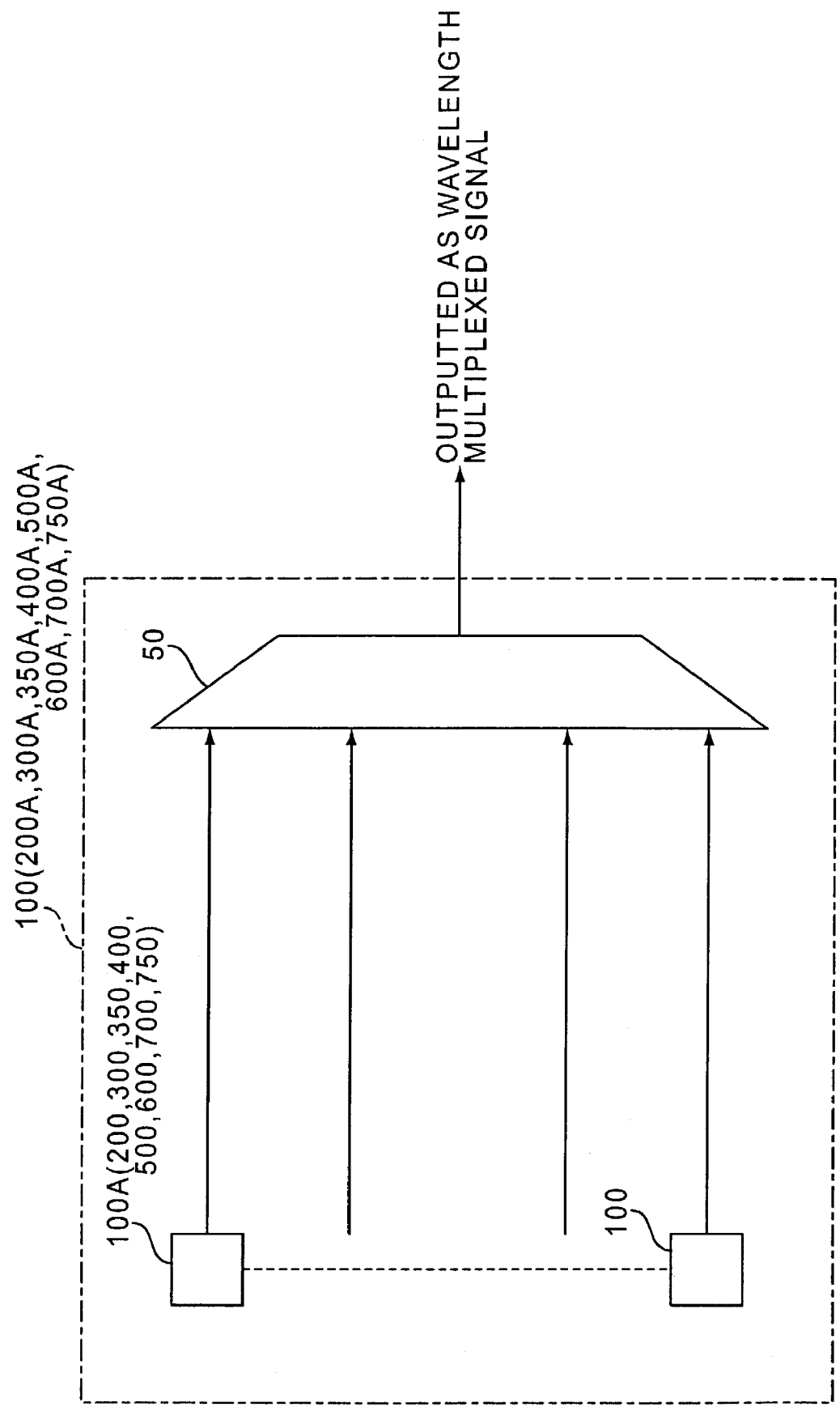

WAVELENGTH MULTIPLEXING TRANSMISSION APPARATUS AND WAVELENGTH DEMULTIPLEXING RECEPTION APPARATUS

This application is a Continuation of application Ser. No. 09/922,777, filed Aug. 7, 2001, now U.S. Pat. No. 6,496,288, which is a divisional of application Ser. No. 09/115,914, filed Jul. 15, 1998, now patented (U.S. Pat. No. 6,295,147).

BACKGROUND OF THE INVENTION

1) Field of the Invention

This invention relates to a wavelength multiplexing transmission apparatus and a wavelength demultiplexing reception apparatus suitable for use with wavelength multiplex transmission of a high density.

2) Description of the Related Art

In recent years, a demand for increase in capacity of a transmission apparatus has been and is progressively increasing as the information society advances progressively. Particularly, increase of the speed in electronics (an increase in transmission speed of an electric signal) is getting difficult after the speed exceeds 10 Gb/s, and it is anticipated significantly to achieve an increase in capacity by an increase in speed on an optical signal level, particularly, by signal transmission to which a wavelength multiplex system is applied.

As a wavelength multiplex system, narrow-band wavelength multiplexing in the 1.55 µm band which provides a wavelength with which the loss of an optical fiber is lowest is considered promising and has already been put into practical use. Further, since this wavelength band coincides with an application wavelength band of an optical amplifier for which an optical fiber doped with erbium is used and also the loss of a wave combiner/separator provided for performing wavelength multiplexing or wavelength demultiplexing can be compensated for by the optical amplifier, wavelength multiplexing of such a large number of waves that is not conventionally available can be performed.

However, in a transmission apparatus which adopts such a wavelength multiplex system as described above, when wavelength arrangement of the wavelengths of a plurality of transmission optical signals (transmission lights) is performed in a narrow band and in a high density in the 1.55 µm band, small variations occur with the wavelengths of the transmission light signals by various causes, and also where a small wavelength variation occurs with some transmission light in this manner, the signal of the channel may not be transmitted successfully or may have an influence on the optical signal of a wavelength of an adjacent channel and bring about crosstalk with the adjacent channel.

In such an instance, a communication error may possibly occur not only with the channel with which the wavelength variation occurs but also with the channel with which the crosstalk occurs.

Accordingly, a transmission apparatus which performs high density wavelength multiplexing or wavelength demultiplexing described above not only has a subject to be solved in that wavelengths of transmission light sources must be stabilized, but also has another subject in that, should wavelength displacement occur, crosstalk with another channel must be prevented.

Further, while some optical signal transmission apparatus include a temperature stabilization circuit or a like circuit for a light source in order to secure stability of the temperature, where the stability of a thermistor which monitors the environment temperature of the light source is not sufficiently high, there is a subject in that it must be taken into consideration that a variation may occur because of deterioration of the thermistor as time passes. On the other hand, also there is another subject in that care must be taken of deterioration of a transmission light source itself which outputs an optical wavelength as time passes.

SUMMARY OF THE INVENTION

It is an object of the present invention to provide a wavelength multiplexing transmission apparatus and a wavelength demultiplexing reception apparatus wherein a variation of a wavelength of a transmission light source is detected to prevent that such variation causes crosstalk with another channel.

In order to attain the object described above, according to an aspect of the present invention, there is provided a wavelength multiplexing transmission apparatus, comprising a plurality of optical signal outputting sections for outputting optical signals having different wavelengths from each other, and a wavelength multiplexing section for wavelength multiplexing the optical signals outputted from the optical signal outputting sections and sending out a resulting optical signal, each of the optical signal outputting sections including a transmission light source and a wavelength filter.

The transmission light source is driven by an electric signal for outputting an optical signal of a predetermined wavelength, and the wavelength filter is capable of passing therethrough and sending out only an optical signal of the predetermined wavelength to be outputted from the transmission light source to prevent a wavelength drift of the optical signal outputted from the transmission light source.

Accordingly, with the wavelength multiplexing transmission apparatus, since, in each of the optical signal outputting sections, the transmission light source is driven by an electric signal to output an optical signal of the predetermined wavelength and the wavelength filter can pass therethrough and send out only the predetermined wavelength to be outputted from the transmission light source to prevent a wavelength drift of the optical signal outputted from the transmission light source, any optical wavelength displaced out of a pertaining predetermined normal range is attenuated by the pertaining wavelength filter and is not transmitted as a wavelength multiplex signal. Consequently, the wavelength multiplex transmission apparatus is advantageous in that crosstalk with another channel can be prevented.

The wavelength multiplexing transmission apparatus may be constructed such that each of the optical signal outputting sections further includes a first abnormal condition detecting section for supervising a level of the optical signal sent out from the wavelength filter and detecting an abnormal condition when the level is lower than a first threshold level set in advance.

The wavelength multiplexing transmission apparatus having the construction just described is advantageous in that, since the first abnormal condition detecting section in each of the optical signal outputting sections supervises a level of the optical signal sent out from the wavelength filter, by discriminating whether or not the level of the optical signal is lower than the first threshold level set in advance, an abnormal condition of the light source wavelength can be detected.

The wavelength multiplexing transmission apparatus may be constructed such that each of the optical signal outputting sections further includes a second abnormal condition detecting section for detecting an abnormal condition of an output level of the optical signal outputted from the transmission light source, and a third abnormal condition detecting section for detecting an abnormal condition of a wavelength of the optical signal outputted from the transmission light source when an abnormal condition is detected by the first abnormal condition detecting section and a normal condition is detected by the second abnormal condition detecting section.

The wavelength multiplexing transmission apparatus having the construction just described is advantageous in that, since, in each of the optical signal outputting sections, the second abnormal condition detecting section detects an abnormal condition of an output level of the optical signal outputted from the transmission light source and the third abnormal condition detecting section supervises results of detection of the first abnormal condition detecting section and the second abnormal condition detecting section, not only an abnormal condition of the light source but also a wavelength displacement can be detected.

According to another aspect of the present invention, there is provided a wavelength multiplexing transmission apparatus, comprising a plurality of optical signal outputting sections for outputting optical signals having wavelengths different from each other, and a wavelength multiplexing section for wavelength multiplexing the optical signals outputted from the optical signal outputting sections and sending out a resulting optical signal, each of the optical signal outputting sections including a light source module, a temperature control section, an ambient temperature detecting section and a fourth abnormal condition detecting section.

The light source module includes a transmission light source, a temperature detecting section, and a heating/cooling section. The temperature detecting section detects an environment temperature of the transmission light source, and the heating/cooling section varies the environment temperature of the transmission light source.

The temperature control section outputs a control signal based on the temperature information detected by the temperature detecting section to the heating/cooling section to control the heating/cooling section so that the environment temperature may be stabilized at a reference temperature set in advance. The fourth abnormal condition detecting section detects an abnormal condition of the light source module based on the control signal from the temperature control section to the heating/cooling section and ambient temperature information detected by an ambient temperature detecting section provided for detecting an ambient temperature of the light source module.

The wavelength multiplexing transmission apparatus of the construction just described is advantageous in that, since, in each of the optical signal outputting sections, the temperature control section outputs a control signal based on the temperature information detected by the temperature detecting section to the heating/cooling section of the light source module, which includes the transmission light source, the temperature detecting section and the heating/cooling section, to control the heating/cooling section so that the environment temperature may be stabilized at the reference temperature set in advance and the fourth abnormal condition detecting section supervises the control signal from the temperature control section to the heating/cooling section and ambient temperature information detected by the ambient temperature detecting section, a wavelength abnormal condition can be detected indirectly by detecting an abnormal condition of a temperature stabilization circuit for the light source which is provided for wavelength stabilization.

According to a further aspect of the present invention, there is provided a wavelength multiplexing transmission apparatus, comprising a plurality of optical signal outputting sections for outputting optical signals having wavelengths different from each other, and a wavelength multiplexing section for wavelength multiplexing the optical signals outputted from the optical signal outputting sections and sending out a resulting optical signal, each of the optical signal outputting sections including a transmission light source driven by an electric signal for outputting an optical signal of a predetermined wavelength, a driving signal control section for controlling the electric signal for driving the transmission light source so that a level of the electric signal for driving the transmission light source may be stabilized at a reference level, and a fifth abnormal condition detecting section for detecting an abnormal condition of the transmission light source based on the level of the electric signal for driving the transmission light source which is controlled by the driving signal control section.

With the wavelength multiplexing transmission apparatus, since, in each of the optical signal outputting sections, the driving signal control section controls the electric signal for driving the transmission light source so that the level of the electric signal for driving the transmission light source may be stabilized at the reference level and the fifth abnormal condition detecting section supervises the level of the electric signal for driving the transmission light source which is controlled by the driving signal control section, there is an advantage that an abnormal condition of the driving current of the transmission light source can be detected and an abnormal condition of the wavelength of the transmission light source can be detected.

According to a still further aspect of the present invention, there is provided a wavelength multiplexing transmission apparatus, comprising a plurality of optical signal outputting sections for outputting optical signals having wavelengths different from each other, and a wavelength multiplexing section for wavelength multiplexing the optical signals outputted from the optical signal outputting sections and sending out a resulting optical signal, each of the optical signal-outputting sections including a light source module including a transmission light source for outputting an optical signal of a predetermined wavelength, a temperature detecting section for detecting an environment temperature of the transmission light source, and a heating/cooling section for varying the environment temperature of the transmission light source, a temperature control section for outputting a control signal based on the temperature information detected by the temperature detecting section to the heating/cooling section to control the heating/cooling section so that the environment temperature may be stabilized at a reference temperature set in advance, an ambient temperature detecting section for detecting an ambient temperature of the light source module, a fourth abnormal condition detecting section for detecting an abnormal condition of the light source module based on a relationship between the control signal from the temperature control section to the heating/cooling section and the ambient temperature information detected by the ambient temperature detecting section, a driving signal control section for controlling an electric signal for driving the transmission light source so that a level of the electric signal for driving the transmission light source may be stabilized at a reference level, a fifth abnormal condition detecting section for detecting an abnormal condition of the light source module based on the level of the electric signal for driving the transmission light source which is controlled by the driving signal control section, and a sixth abnormal condition detecting section for detecting an abnormal condition of a wavelength of the optical signal outputted from the transmission light source when an abnormal condition is detected by the fourth abnormal condition detecting section or the fifth abnormal condition detecting section.

With the wavelength multiplexing transmission apparatus, since, in each of the optical signal outputting sections, the fourth abnormal condition detecting section supervises the control signal from the temperature control section to the heating/cooling section and the ambient temperature detected by the ambient temperature detecting section while the fifth abnormal condition detecting section supervises the level of the electric signal for driving the transmission light source which is controlled by the driving signal control section and the sixth abnormal condition detecting section supervises results of detection of the fourth abnormal condition detecting section and the fifth abnormal condition detecting section, there is an advantage that a wavelength abnormal condition can be detected indirectly by detecting an abnormal condition of a temperature stabilization circuit for the light source which is provided for wavelength stabilization, and also there is another advantage that an abnormal condition of the driving current for the transmission light source can be detected and an abnormal condition of the wavelength of the transmission light source can be detected.

The wavelength multiplexing transmission apparatus may be constructed such that, when an abnormal condition of the light source module or the transmission light source is detected, the optical signal to be outputted from the optical signal outputting section to the wavelength multiplexing section is switched into an interruption condition.

With the wavelength multiplexing transmission apparatus having the construction just described, there is an advantage that, when an abnormal condition of the light source module or the transmission light source is detected, by switching the optical signal to be outputted from the optical signal outputting section, with which the abnormal condition is detected, to the wavelength multiplexing section into an interruption condition, crosstalk with another channel can be prevented and a further influence of it can be prevented.

According to a yet further aspect of the present invention, there is provided a wavelength demultiplexing reception apparatus, comprising a wavelength demultiplexing section, a plurality of light reception sections, a plurality of error detecting sections, and a first transmission side wavelength abnormal condition detecting section.

The wavelength demultiplexing section receives, from a transmission side, a wavelength multiplexed optical signal including data having a predetermined format and demultiplexes the optical signal into a plurality of optical signals having wavelengths different from each other and same as those prior to the wavelength multiplexing.

Each of the light reception sections includes an interruption condition detecting section, which converts a pertaining one of the optical signals demultiplexed by the wavelength demultiplexing section into an electric signal and outputs, when the optical signal inputted to the light reception section is put into an interruption condition, detection information representing the interruption.

The error detecting section detects a data error with respect to the predetermined format from data included in the electric signals after the conversion by the light reception sections.

The first transmission side wavelength abnormal condition detecting section detects a wavelength with which an abnormal condition occurs from among wavelengths of the optical signals for which the wavelength multiplexing has been performed on the transmission side based on the detection information of the interruption condition detecting sections of the light reception sections and the data error detection information from the error detecting sections.

With the wavelength multiplexing transmission apparatus, there is an advantage that, since the wavelength demultiplexing section demultiplexes a wavelength multiplexed optical signal received from the transmission side and including data having a predetermined format into a plurality of optical signals having wavelengths different from each other and same as those prior to the wavelength multiplexing and the interruption condition detecting section of each of the light reception sections receives and converts a pertaining one of the optical signals demultiplexed by the wavelength demultiplexing section into an electric signal and outputs, when the optical signal inputted to the light reception section is put into an interruption condition, detection information representing the interruption and besides the error detecting sections detect a data error with respect to the predetermined format from data included in the electric signals after the conversion by the light reception sections and the first transmission side wavelength abnormal condition detecting section supervises the detection information of the interruption condition detecting sections of the light reception sections and the data error detection information from the error detecting sections, there is an advantage that an abnormal condition of the wavelength can be detected. Further, should some wavelength displacement of a signal light source of any of the wavelength multiplexing transmission apparatus occur, since the light source with which the wavelength displacement occurs can be specified, there is an another advantage that a countermeasure of replacement of a panel and/or release from the trouble can be taken rapidly.

The wavelength demultiplexing reception apparatus may be constructed such that the first transmission side wavelength abnormal condition detecting section is operable to detect that an abnormal condition occurs with a wavelength of one of two optical signals having adjacent wavelength bands to each other from among the optical signals for which the wavelength multiplexing has been performed on the transmission side when an interruption condition of one of the two optical signals which has a first wavelength is detected by a corresponding one of the interruption condition detecting sections and a data error of the optical signal which has a second wavelength is detected by a corresponding one of the error detecting sections.

The wavelength demultiplexing reception apparatus having the construction just described is advantageous in that, since the first transmission side wavelength abnormal condition detecting section supervises each two adjacent optical signals, an optical signal outputting section with which a wavelength abnormal condition occurs can be specified.

The wavelength demultiplexing reception apparatus may further comprise a transfer section for transferring, when it is detected by the first transmission side wavelength abnormal condition detecting section that an abnormal condition occurs with a wavelength of one of two optical signals, abnormal condition detection information representing such detection to the transmission side so that the optical signal of the wavelength with which the abnormal condition occurs may be put into an interruption condition.

The wavelength demultiplexing reception apparatus having the construction just described is advantageous in that, as the transfer section transfers abnormal condition detection information for putting the optical signal of the wavelength with which the abnormal condition occurs into an interruption condition, crosstalk with another channel can be prevented and a further influence of it can be prevented.

The wavelength demultiplexing reception apparatus may be constructed such that the transfer section uses one of ascending and descending lines between the wavelength demultiplexing reception apparatus and the transmission side which is different from that line which is used for transmission of the wavelength multiplexed optical signal from the transmission side.

With the wavelength demultiplexing reception apparatus having the construction just described, there is an advantage that, since, when the transfer section tries to transfer abnormal condition detection information to the transmission side, it uses one of the lines which is different from that one of the lines which is used for transmission of the wavelength multiplexed optical signal from the transmission side, an optical wavelength which may possibly cause crosstalk with another channel can be interrupted.

According to a yet further aspect of the present invention, there is provided a wavelength demultiplexing reception apparatus, comprising a branching section, a plurality of variable wavelength filters, a plurality of filter control sections and a second transmission side wavelength abnormal condition detecting section.

The branching section receives a wavelength multiplexed optical signal from a transmission side and power branches the received wavelength multiplexed optical signal into a number of wavelength multiplexed optical signals equal to a number of multiplexed wavelengths different from each other.

The variable wavelength filters receive the wavelength multiplexed optical signals power branched by the branching section and pass optical signals of the different wavelengths therethrough.

The filter control sections output control signals to the variable wavelength filters to control the wavelengths of optical signals which can pass through the variable wavelength filters to follow up and pass the optical signals outputted from the variable wavelength filters, respectively.

The second transmission side wavelength abnormal condition detecting section detects, based on the control signals outputted from the filter control sections, a wavelength with which an abnormal condition occurs from among the wavelengths of optical signals for which the wavelength multiplexing has been performed on the transmission side.

With the wavelength demultiplexing reception apparatus, there is an advantage that, since the branching section power branches a wavelength multiplexed optical signal received from the transmission side into a number of wavelength multiplexed optical signals equal to the number of multiplexed wavelengths and the variable wavelength filters pass therethrough the optical signals of the wavelengths different from each other and same as those prior to the wavelength multiplexing from among the wavelength multiplexed optical signals power branched by the branching section and then the filter control sections output control signals to the variable wavelength filters so as to follow up and pass the optical signals outputted from the variable wavelength filters and the second transmission side wavelength abnormal condition detecting section supervises the control signals outputted from the filter control sections, a wavelength abnormal condition can be detected.

The wavelength demultiplexing reception apparatus may further comprise a transfer section for transferring, when it is detected by the second transmission side wavelength abnormal condition detecting section that an abnormal condition occurs with the wavelength of one of the optical signals, abnormal condition detection information representing the abnormal condition to the transmission side in order to put the optical signal of the wavelength with which the abnormal condition occurs into an interruption condition.

With the wavelength demultiplexing reception apparatus having the construction just described, there is an advantage that, as the transfer section transfers abnormal condition detection information for putting the optical signal of the wavelength with which the abnormal condition occurs into an interruption condition to the transmission side, crosstalk with another channel can be prevented and a further influence of it can be prevented.

The wavelength demultiplexing reception apparatus may be constructed such that the transfer section uses one of ascending and descending lines between the wavelength demultiplexing reception apparatus and the transmission side which is different from that line which is used for transmission of the wavelength multiplexed optical signal from the transmission side.

With the wavelength demultiplexing reception apparatus having the construction just described, there is an advantage that, since, when the transfer section tries to transfer abnormal condition detection information to the transmission side, it uses one of the lines which is different from that one of the lines which is used for transmission of the wavelength multiplexed optical signal from the transmission side, an optical wavelength which may possibly cause crosstalk with another channel can be interrupted with certainty.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 20 is a circuit diagram illustrating a function of a shutdown control circuit according to the seventh embodiment of the present invention;

FIG. 27 is a block diagram showing a wavelength multiplex transmission apparatus according to the first embodiment of the present invention.

DESCRIPTION OF THE PREFERRED EMBODIMENTS

In the following, several preferred embodiments of the present invention are described with reference to the accompanying drawings.

a. First Embodiment

FIG. 27 is a block diagram showing a wavelength multiplexing transmission apparatus 100A according to a first embodiment of the present invention. Referring to FIG. 27, the wavelength multiplexing transmission apparatus 100A shown includes a plurality of optical signal transmission sections 100 and a wavelength multiplexing section 50. The optical signal transmission sections 100 individually include light sources 1 (not shown in FIG. 27, but shown, for example, in FIG. 1) which output optical wavelengths different from one another, and the wavelength multiplexing section 50 multiplexes the plurality of optical wavelengths (for example, of the 1.55 µm band) in a high density so that a multiplex signal can be sent out at a transmission rate higher than, for example, approximately 600 MHz.

Figure 1:
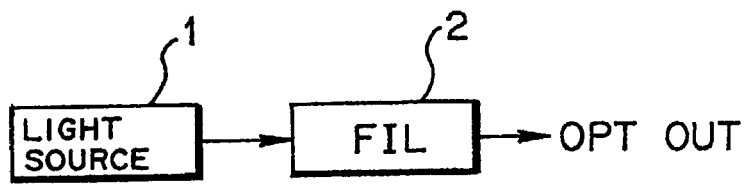
FIG. 1 is a block diagram showing an optical signal outputting section according to a first embodiment of the present invention.

Each of the optical signal transmission sections 100 includes, as particularly shown in FIG. 1, a light source 1 and a wavelength filter (FIL) 2.

It is to be noted that the construction shown in FIG. 27 may be not only a construction of a single apparatus but also a composite construction of several apparatus.

Referring to FIG. 1, the light source 1 is a transmission light source which is driven by an electric signal and outputs an optical signal of a predetermined wavelength, and is formed from a semiconductor laser (laser diode) or a like element.

Figure 2:
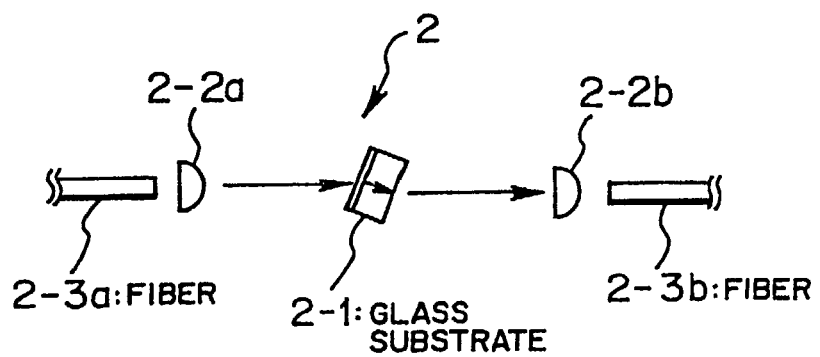
FIG. 2 is a block diagram showing a wavelength filter according to the first embodiment of the present invention.

The wavelength filter 2 can pass and send out only an optical signal of the predetermined wavelength outputted from the light source 1 in order to prevent a wavelength drift of the optical signal outputted from the light source 1. The wavelength filter 2 is formed from, for example, as shown in FIG. 2, a dielectric multi-layer film 2-1 and a pair of lenses 2-2a and 2-2b.

The dielectric multi-layer film 2-1 is formed from, for example, two different kinds of dielectric thin films of different refraction indices placed alternately in several to ten and several layers (formed as a glass substrate) and can be constructed, based on refractive indices of the media and so forth such that it passes therethrough light only of a predetermined wavelength band from within an optical signal inputted thereto from the light source 1 through a fiber 2-3a and the lens 2-2a.

Figure 3:
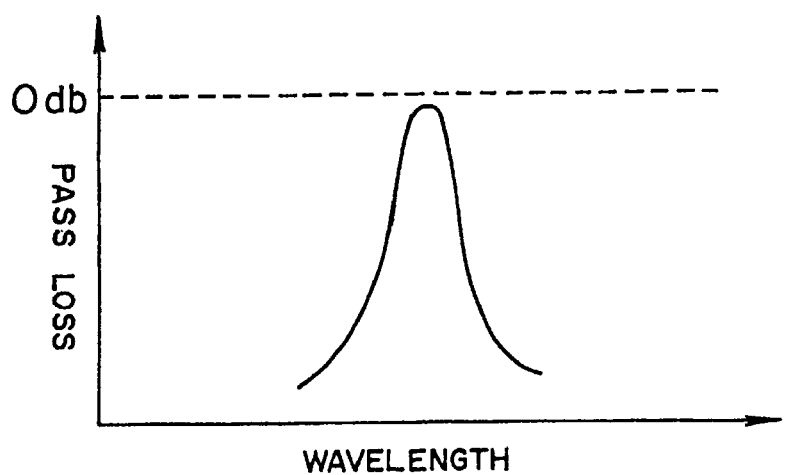
FIG. 3 is a diagram illustrating a loss characteristic of the wavelength filter shown in FIG. 2.

FIG. 3 illustrates a loss characteristic of an optical signal of the wavelength filter 2 with respect to the optical wavelength. As seen from FIG. 3, the loss value of the optical signal which passes through the wavelength filter 2 increases as the wavelength displacement increases. In other words, the wavelength filter 2 is adjusted so that the wavelength with which the transmission loss thereof is lowest may be equal to the optical wavelength to be sent out from the light source 1 described above. Consequently, the wavelength filter 2 can pass therethrough only the optical wavelength which is to be outputted from the light source 1.

Each of the optical signal transmission sections 100 of the wavelength multiplexing transmission apparatus 100A according to the first embodiment having the construction described above is driven by a desired electric signal to output an optical signal.

An optical signal outputted from the light source 1 of each of the optical signal transmission sections 100 is outputted to the wavelength filter 2 through the fiber 2-3a. In particular, the optical signal from the fiber 2-3a is collimated by the lens 2-2a and inputted to the dielectric multi-layer film 2-1. Only a predetermined optical wavelength component of the optical signal inputted to the dielectric multi-layer film 2-1 passes through the glass substrate of the dielectric multi-layer film 2-1 and is emitted to a fiber 2-3b through the lens 2-2b. However, optical wavelengths other than the predetermined optical wavelength do not pass through the glass substrate of the dielectric multi-layer film 2-1 and therefore are not emitted to the fiber 2-3b.

In this manner, with the wavelength multiplexing transmission apparatus 100A according to the first embodiment of the present invention, if an optical signal emitted from the light source 1 in each of the optical signal transmission sections 100 is displaced from a predetermined normal range, then it is attenuated by the wavelength filter 2 connected in series to the output of the light source 1 and is not outputted as a transmitter output. Consequently, each of the optical signal transmission sections 100 does not output an optical signal having a wavelength other than the wavelength to be outputted originally from the optical signal transmission section 100, and accordingly, crosstalk with another channel can be prevented.

It is to be noted that the wavelength filter 2 described above may be of the fixed wavelength type or of the variable wavelength type whose wavelength is fixed to a predetermined wavelength, and also for the transmission light source, a light source not only of the fixed wavelength type but also of the variable wavelength type may be used.

b. Second Embodiment

Referring back to FIG. 27, also a wavelength multiplexing transmission apparatus 200A according to a second embodiment of the present invention is constructed, similarly to the wavelength multiplexing transmission apparatus 100A of the first embodiment described above, such that a plurality of different optical wavelengths (of the 1.55 µm band) are multiplexed in a high density by a wavelength multiplexing section 50 so that a multiplex signal can be outputted at a transmission rate of, for example, approximately 600 MHz or more. However, the wavelength multiplexing transmission apparatus 200A includes, in place of the optical signal transmission sections 100 of the wavelength multiplexing transmission apparatus 100A of the first embodiment described above, a plurality of optical signal outputting sections 200 which are different from the optical signal transmission sections 100.

Figure 4:
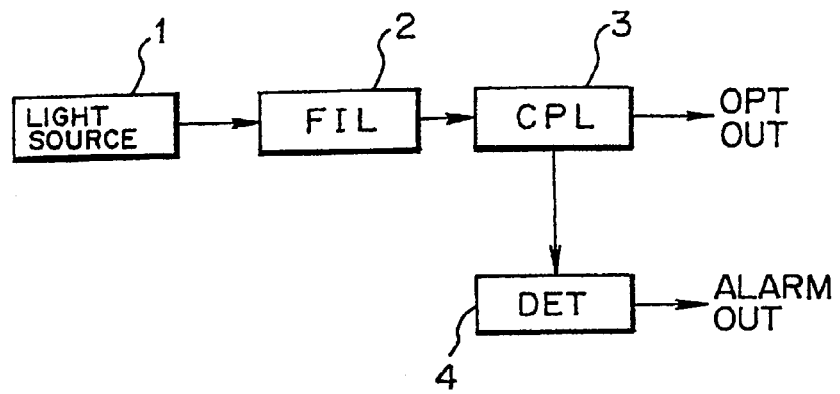
FIG. 4 is a block diagram showing an optical signal outputting section according to a second embodiment of the present invention.

FIG. 4 shows a construction of each of the optical signal outputting sections 200 employed in the wavelength multiplexing transmission apparatus 200A according to the second embodiment. Referring to FIG. 4, the optical signal outputting section 200 shown is similar in construction to but different from the optical signal transmission section 100 of the wavelength multiplexing transmission apparatus 100A of the first embodiment in that it additionally includes a coupler (CPL) 3 and a detector (DET) 4.

It is to be noted that overlapping description of the common components to those of the first embodiment is omitted here to avoid redundancy.

Figure 5A:
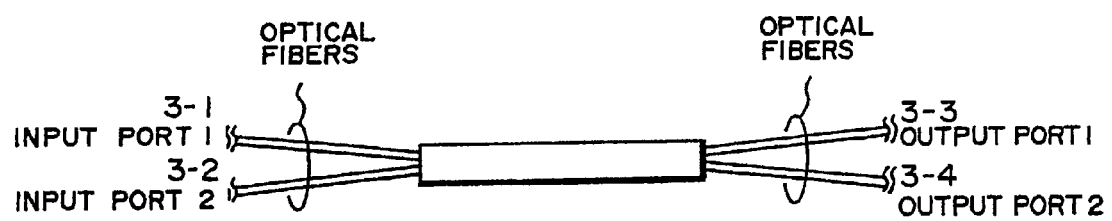
FIGS. 5(a) and 5(b) are schematic views showing a coupler according to the second embodiment of the present invention.
Figure 5B:
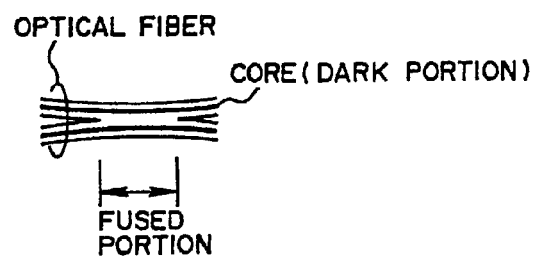

The coupler 3 branches light, and an example of the coupler 3 is shown in FIGS. 5(*a*) and 5(*b*). Referring to FIGS. 5(*a*) and 5(*b*), the coupler 3 is formed from two optical fibers fused to each other, and is constructed such that it can branch an optical signal inputted thereto from one of input ports 3-1 and 3-2 and emit the branched optical signals from two output ports 3-3 and 3-4.

The detector 4 serves as a first abnormal condition detecting section and supervises the level of an optical signal sent out from the wavelength filter 2.

Figure 6:
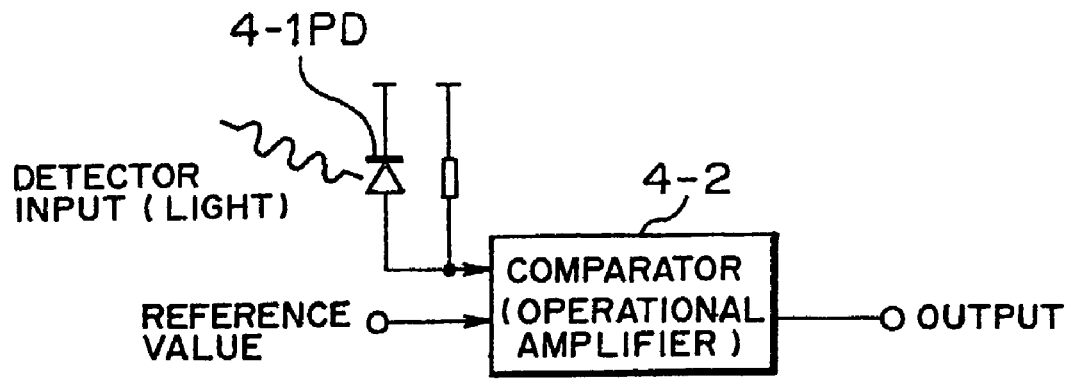
FIG. 6 is a diagrammatic view showing a detector according to the second embodiment of the present invention.

FIG. 6 shows the detector 4 employed in the second embodiment of the present invention. Referring to FIG. 6, the detector 4 includes a photodiode (PD) 4-1 and a comparator 4-2. An optical signal branched by the coupler 3 is inputted to the detector 4, in which it is converted into an electric signal by the photodiode 4-1. The comparator 4-2 compares the value of current produced by the conversion with a predetermined reference value. An operational amplifier or a like element is used for the comparator 4-2.

For the predetermined reference value to be used for the comparison by the comparator 4-2, for example, an allowable lowest level value of an optical signal from the light source 1 which is allowable as a normal signal from the optical signal outputting section 200 is used.

Figure 7:
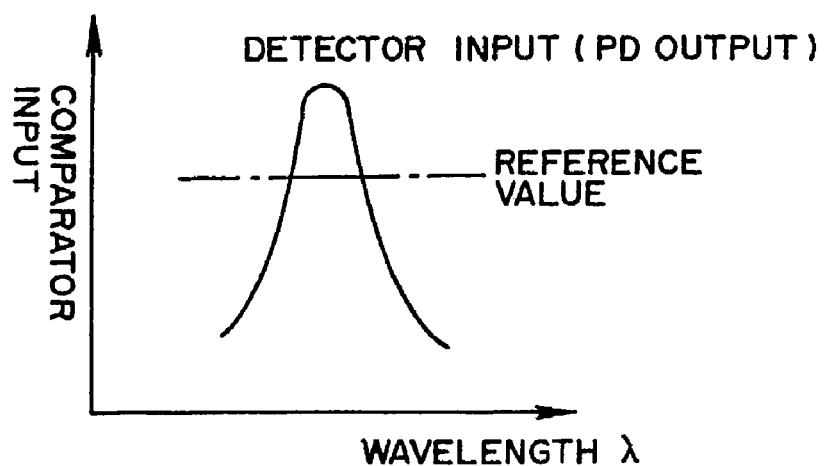
FIG. 7 is a diagram illustrating a relationship between the level value and the wavelength of an optical signal inputted to a comparator according to the second embodiment of the present invention.

FIG. 7 illustrates a relationship between the level value (power value) and the wavelength of an optical signal inputted to the comparator 4-2. As seen from FIG. 7, where the optical signal from the coupler 3 is an optical signal to be outputted originally with a predetermined wavelength set in advance, the optical signal level from the coupler 3 is higher than the reference value inputted to the comparator 4-2.

On the other hand, as the displacement from the original wavelength increases, the input level value of the optical signal to the comparator 4-2 is decreased by operation of the wavelength filter 2, and if the degree of the wavelength displacement becomes larger than the allowable range, the optical signal level becomes lower than the reference value and consequently goes out of the range within which the optical signal is allowable as a normal optical signal from the optical signal outputting section 200. Consequently, the optical signal is outputted as alarm information.

With the optical signal outputting section 200 having the construction described above, an optical signal sent out from the light source 1 is attenuated by the wavelength filter 2 and branched by the coupler 3, and one of two optical signals obtained by the branching is sent to the detector 4. The other branched optical signal is sent to the element which multiplexes optical signals.

In the detector 4, the optical signal is converted into an electric signal by the photodiode 4-1, and based on the electric signal, the comparator 4-2 supervises the optical signal from the light source 1 sent thereto through the wavelength filter 2 and so forth.

In particular, the comparator 4-2 compares the level of the optical signal received from the wavelength filter 2 with the reference value set in advance and outputs, when the optical signal level is lower than the reference value, a signal (alarm or the like) representing that the light source is abnormal.

As described above, the detector 4 supervises the level of the optical signal sent out from the wavelength filter 2 and detects an abnormal condition when the level is lower than the reference value to the comparator 4-2. The detector 4 thus exhibits a function of the first abnormal condition detecting section.

In this manner, with the wavelength multiplexing transmission apparatus 200A according to the second embodiment of the present invention, since an abnormal condition of the light source 1 can be detected by the comparator 4-2 which compares an electric signal obtained by conversion of the optical signal sent out from the light source 1 by the photodiode 4-1 of the detector 4 with the reference value determined in advance, there is an advantage that an appropriate countermeasure against the abnormal condition can be taken rapidly while preventing crosstalk with another channel.

c. Third Embodiment

Referring back to FIG. 27, also a wavelength multiplexing transmission apparatus 300A according to a third embodiment of the present invention is constructed, similarly to the wavelength multiplexing transmission apparatus 100A of the first embodiment described above, such that a plurality of different optical wavelengths (of the 1.55 µm band) are multiplexed in a high density by a wavelength multiplexing section 50 so that a multiplex signal can be outputted at a transmission rate of, for example, approximately 600 MHz or more. However, the wavelength multiplexing transmission apparatus 300A includes, in place of the optical signal transmission sections 100 of the wavelength multiplexing transmission apparatus 100A of the first embodiment described above, a plurality of optical signal outputting sections 300 which are different from the optical signal transmission sections 100.

Figure 8:
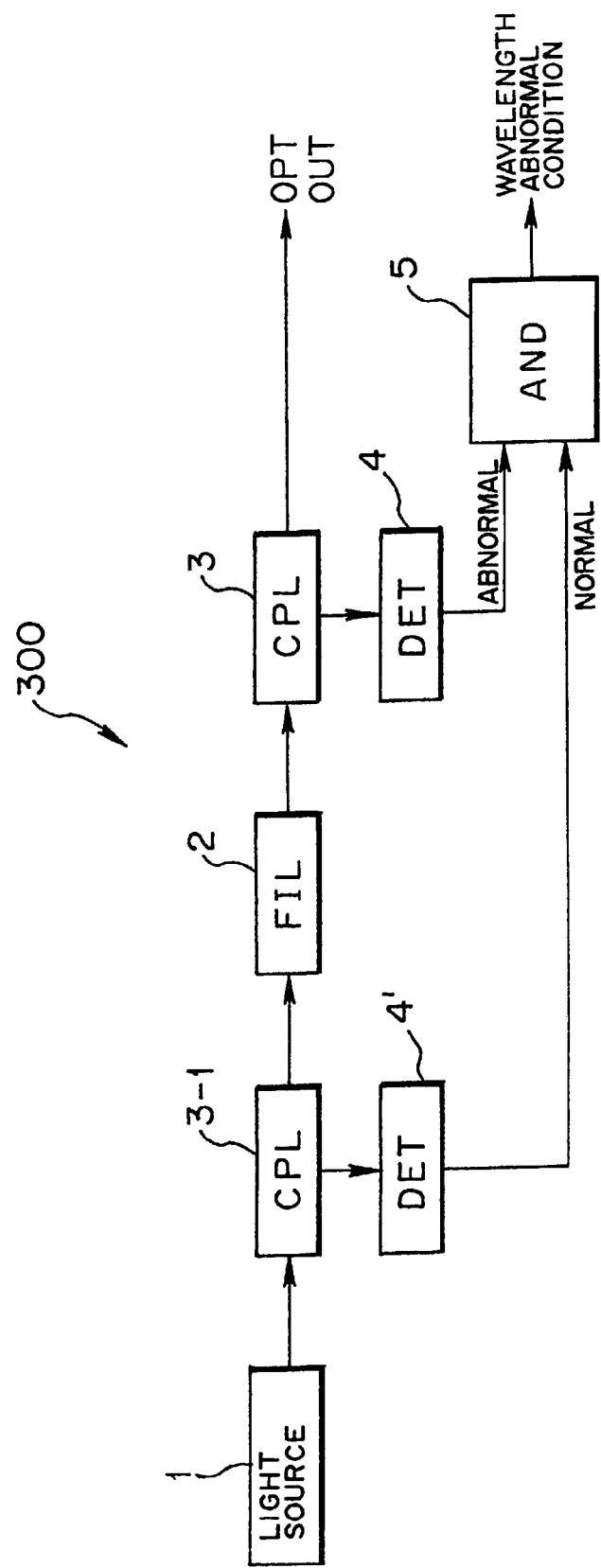
FIG. 8 is a block diagram showing an optical signal outputting section according to a third embodiment of the present invention.

FIG. 8 shows a construction of each of the optical signal outputting sections 300 employed in the wavelength multiplexing transmission apparatus 300A according to the third embodiment. Referring to FIG. 8, the optical signal outputting section 300 shown is similar in construction to but different from the optical signal transmission section 100 of the wavelength multiplexing transmission apparatus 100A of the first embodiment in that it includes a coupler (CPL) 3-1, a detector (DET) 4' and an AND circuit 5 in addition to the components 1, 2, 3 and 4 described above.

It is to be noted that overlapping description of the common components (1, 2, 3 and 4) to those of the first and second embodiments is omitted here to avoid redundancy.

The coupler 3-1 is disposed, similarly to the coupler 3, in series to the output of the light source 1 and branches an optical signal similarly to the coupler 3.

The detector 4' functions as a second abnormal condition detecting section and detects whether or not the output level of the optical signal from the light source 1 is equal to or higher than a predetermined level. The detector 4' thus has a basically similar construction to that of the detector 4 described hereinabove with reference to FIG. 6.

Consequently, the detector 4' outputs, when a desired optical signal from the coupler 3-1 is detected, a signal representing that the optical signal is normal to the AND circuit 5.

The AND circuit 5 detects, based on the signals from the detectors 4 and 4', whether or not a displacement in optical wavelength is present. More particularly, if the result of detection from the detector 4 represents an abnormal condition (represents that the level of the inputted optical signal is lower than the pertaining reference value) and the result of detection from the detector 4' represents a normal condition (represents that the level of the inputted optical signal is higher than the pertaining reference value), the AND circuit 5 outputs, as alarm information, a signal representing that the wavelength of the optical signal outputted from the light source 1 exhibits some displacement.

In each of the optical signal outputting sections 300 of the wavelength multiplexing transmission apparatus 300A according to the third embodiment having the construction described above, an optical signal from the light source 1 branched by the coupler 3-1 is sent to the detector 4', by which it is discriminated whether or not the optical signal has a level equal to or higher than the desired optical output level.

Meanwhile, the optical signal which passes through the coupler 3-1 passes through the wavelength filter 2 and is branched by the coupler 3. One of two optical signals obtained by the branching is sent to the detector 4', by which it is discriminated whether or not the level value of the optical signal from the light source 1 is equal to or higher than the pertaining predetermined reference value. The detector 4' thus outputs information of a result of the discrimination to the AND circuit 5.

The AND circuit 5 detects based on the result of detection from the detector 4 and the result of detection from the detector 4' whether or not the optical signal of the light source 1 is normal. If the AND circuit 5 receives, from the detector 4', a signal representing that the optical signal level value of the light source 1 is higher than the pertaining predetermined reference level and is normal and receives, from the detector 4, another signal representing that the optical signal is lower than the pertaining predetermined level value and is abnormal, then the AND circuit 5 detects that the wavelength is abnormal and outputs a signal representing this.

As described above, the AND circuit 5 exhibits a function as a third abnormal condition detecting section which detects an abnormal condition of the wavelength of an optical signal outputted from the transmission light source when an abnormal condition is detected by the detector 4 serving as the first abnormal condition detecting section and a normal condition is detected by the detector 4' serving as the second abnormal condition detecting section.

In this manner, with the wavelength multiplexing transmission apparatus 100A of the third embodiment of the present invention, since each of the optical signal outputting sections 300 performs, due to the provision of the detectors 4 and 4' and the AND circuit 5, double discrimination of whether or not an optical output of the light source 1 itself is normal and whether or not the optical signal which passes through the wavelength filter 2 is a desired optical output, there is an advantage that not only a mere abnormal condition of the light source but also some displacement in wavelength can be detected and consequently it can be recognized immediately that a cause of the abnormal condition of the light source resides in an abnormal wavelength.

It is to be noted that, if it is discriminated by the detector 4' that the optical wavelength from the light source 1 is not equal to or higher than the desired level, then the AND circuit 5 may output abnormal condition detection information of the light source in place of the information of an abnormal condition of the wavelength.

Also in this instance, an abnormal condition of the light source can be detected by the detector 4' by comparing the optical output level from the light source 1 with a reference value set in advance.

c1. Modification to the Third Embodiment

Referring back to FIG. 27, also a wavelength multiplexing transmission apparatus 350A according to a modification to the third embodiment of the present invention is constructed, similarly to the wavelength multiplexing transmission apparatus 100A of the first embodiment described above, such that a plurality of different optical wavelengths (of the 1.55 μm band) are multiplexed in a high density by a wavelength multiplexing section 50 so that a multiplex signal can be outputted at a transmission rate of, for example, approximately 600 MHz or more. However, the wavelength multiplexing transmission apparatus 350A includes, in place of the optical signal transmission sections 100 of the wavelength multiplexing transmission apparatus 100A of the first embodiment described above, a plurality of optical signal outputting sections 350 which are different from the optical signal transmission sections 100.

Figure 9:
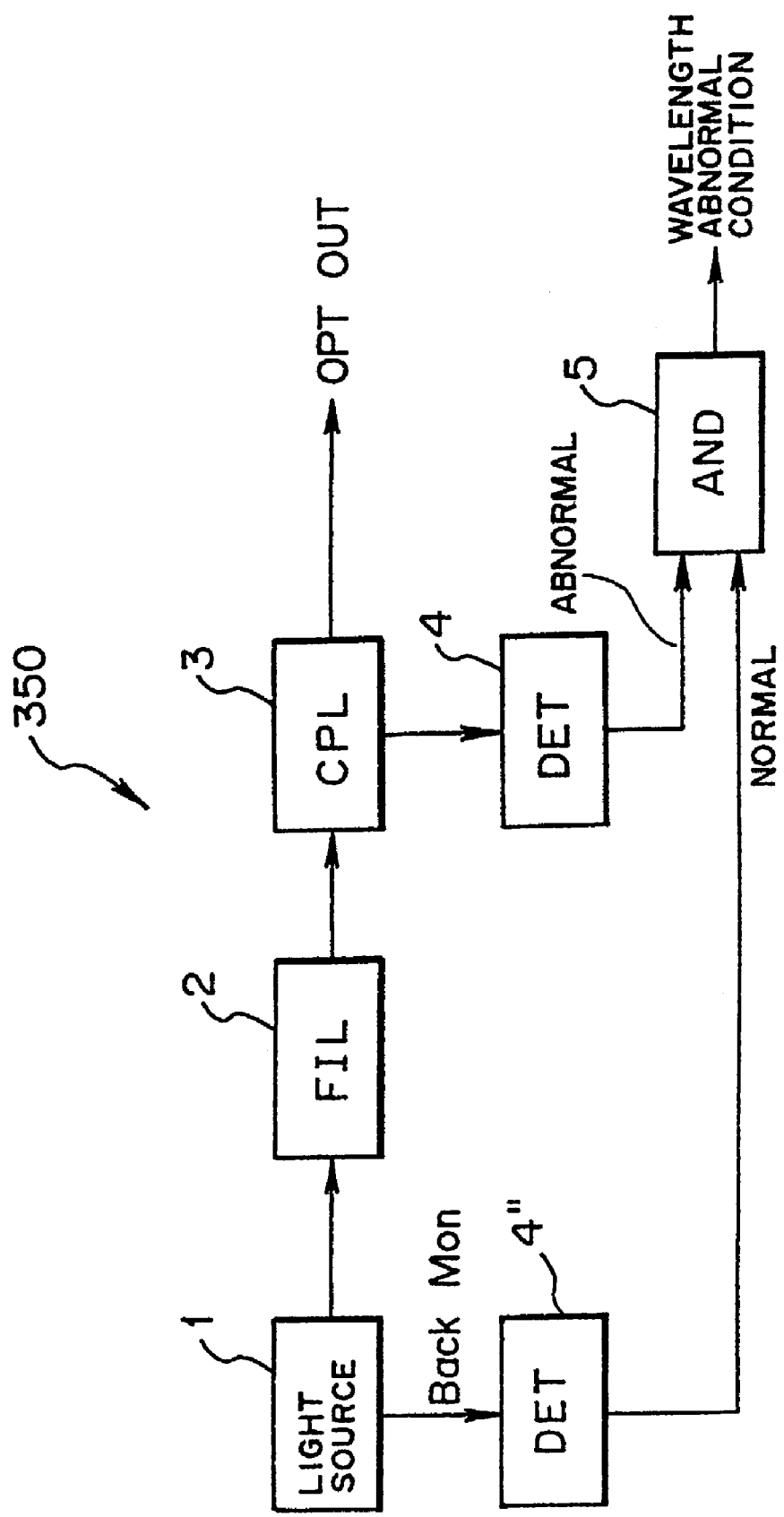
FIG. 9 is a block diagram showing a modification to the optical signal outputting section of FIG. 8.

FIG. 9 shows a construction of each of the optical signal outputting sections 350 employed in the wavelength multiplexing transmission apparatus 350A according to the modification to the third embodiment. Referring to FIG. 9, the optical signal outputting section 350 shown is similar in construction to but different from the optical signal outputting section 300 of the wavelength multiplexing transmission apparatus 300A of the third embodiment in that it does not include the coupler 3-1 and includes a detector 4" for monitoring back light of the light source 1 in place of the detector 4' for supervising an optical signal branched by the coupler 3-1 in addition to the components 2, 3, 4 and 5 described hereinabove.

It is to be noted that overlapping description of the common components (2, 3, 4 and 5) to those of the first to third embodiments is omitted here to avoid redundancy.

The detector 4" functions as the second abnormal condition detecting section, and supervises back light from the light source 1 and compares the thus caught back light with a reference value set in advance to discriminate whether or not the optical wavelength from the light source 1 is sent out with a desired output level. The detector 4" thus has a construction basically similar to that of the detector 4 described hereinabove.

In each of the optical signal outputting sections 350 of the wavelength multiplexing transmission apparatus 350A according to the modification to the third embodiment having the construction described above, the detector 4" supervises the level of back light from the light source 1 to discriminate whether or not the output level of the optical wavelength is normal, and only a desired optical signal having a desired optical wavelength from within an optical signal transmitted through the fiber is allowed to pass through the wavelength filter 2 and then the output level of the optical wavelength branched by the coupler 3 is compared with the predetermined reference value by the detector 4.

The detector 4" supervises back light of the light source 1 and outputs, if a result of comparison with the reference value proves that the output value of the optical wavelength from the light source 1 exceeds the desired reference value, a signal representing that the output level of the optical wavelength is normal to the AND circuit 5.

The AND circuit 5 discriminates, based on the signals received from the detector 4 and the detector 4", whether or not the optical signal from the light source 1 suffers from some wavelength displacement in optical wavelength. Here, if the signal from the detector 4" exhibits a normal condition and the signal from the detector 4 exhibits an abnormal condition, then the AND circuit 5 outputs a signal representing that the wavelength is abnormal. Accordingly, the AND circuit 5 exhibits a function as the third abnormal condition detecting section.

In this manner, with the wavelength multiplexing transmission apparatus 350A according to the modification to the third embodiment of the present invention, since each of the optical signal outputting sections 350 performs, due to the provision of the detectors 4 and 4" and the AND circuit 5, double discrimination of whether or not an optical output of the light source 1 itself is normal and whether or not the optical signal which passes through the wavelength filter 2 is a desired optical output, there is an advantage that not only a mere abnormal condition of the light source but also displacement in wavelength can be detected, and consequently, it can be recognized immediately that a cause of the abnormal condition of the light source resides in an abnormal wavelength and therefore a countermeasure against the abnormal condition can be taken immediately.

It is to be noted that, if it is discriminated by the detector 4" that the optical wavelength from the light source 1 is not equal to or higher than the desired level, then the AND circuit 5 may output light source abnormal condition detection information in place of the information of an abnormal condition of the wavelength.

Further, comparing with the optical signal outputting sections 300 of the third embodiment described above, there is no need of provision of the coupler 3-1 in the main signal system, and consequently, otherwise possible loss of the optical signal by the coupler 3-1 can be eliminated.

d. Fourth Embodiment

Referring back to FIG. 27, also a wavelength multiplexing transmission apparatus 400A according to a fourth embodiment of the present invention is constructed, similarly to the wavelength multiplexing transmission apparatus 100A of the first embodiment described above, such that a plurality of different optical wavelengths (of the 1.55 µm band) are multiplexed in a high density by a wavelength multiplexing section 50 so that a multiplex signal can be outputted at a transmission rate of, for example, approximately 600 MHz or more. However, the wavelength multiplexing transmission apparatus 400A includes, in place of the optical signal transmission sections 100 of the wavelength multiplexing transmission apparatus 100A of the first embodiment described above, a plurality of optical signal outputting section 400 which are different from the optical signal transmission sections.

Figure 10:
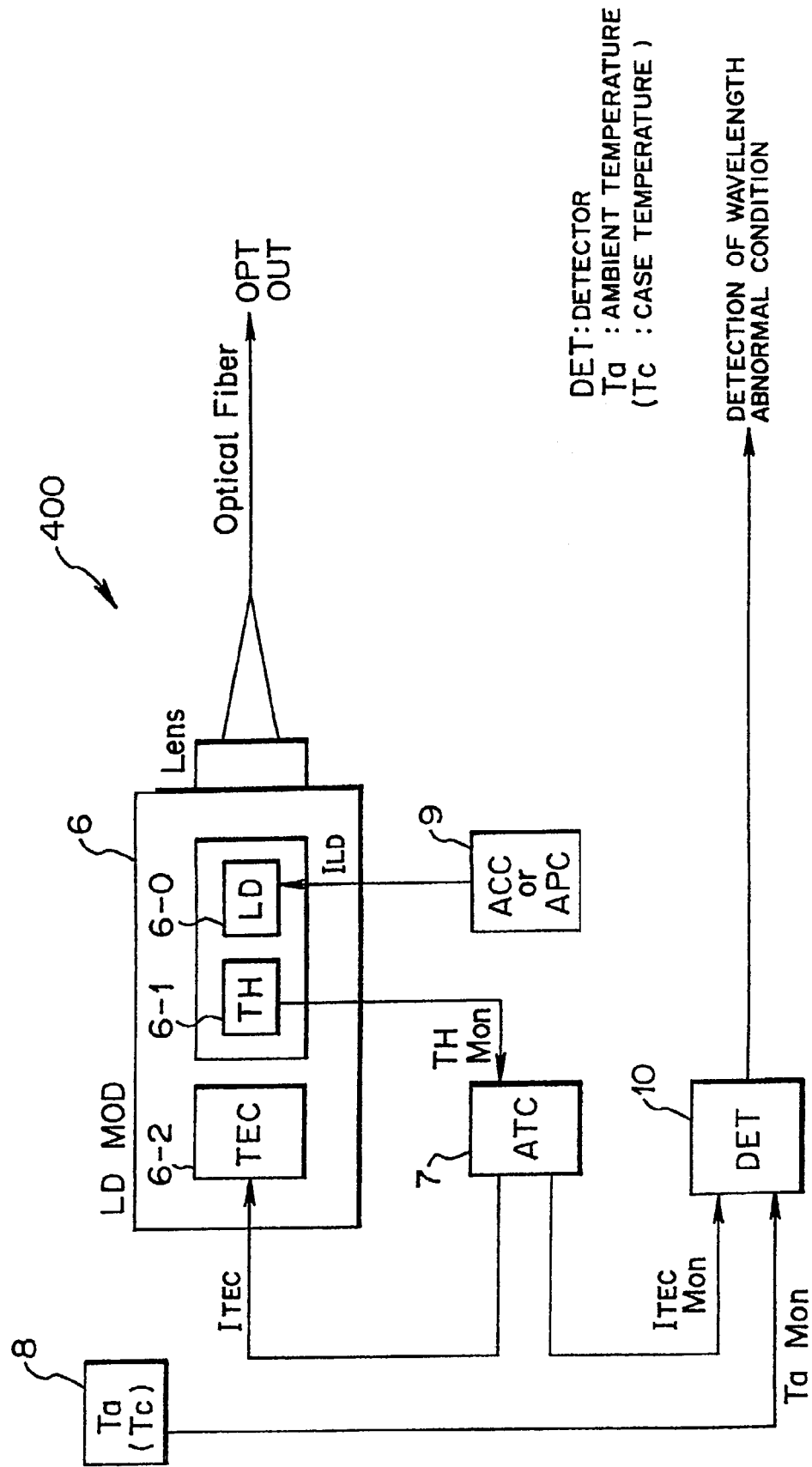
FIG. 10 is a block diagram showing an optical signal outputting section according to a fourth embodiment of the present invention.

FIG. 10 shows a construction of each of the optical signal outputting sections 400 employed in the wavelength multiplexing transmission apparatus 400A according to the fourth embodiment. Referring to FIG. 10, the optical signal outputting section 400 shown includes a light source module or laser diode module (LD MOD) 6, an automatic temperature control (ATC) circuit 7, an ambient temperature supervision circuit (Ta (Tc)) 8, an automatic current control (ACC) circuit 9 and a detector (DET) 10.

The laser diode module 6 includes a laser diode (LD) 6-0 serving as a transmission light source for outputting an optical signal of a predetermined wavelength, a thermistor (TH) 6-1 serving as a temperature detection element, and a thermoelectric control (TEC) element 6-2 serving as a heating/cooling element, all packaged in a single housing or case. The laser diode 6-0 serves as a transmission light source for outputting an optical signal of a predetermined wavelength. The thermistor 6-1 detects an ambient temperature in the proximity of the laser diode 6-0. The thermoelectric control element 6-2 variably controls the environment temperature of the laser diode 6-0.

Figure 11:
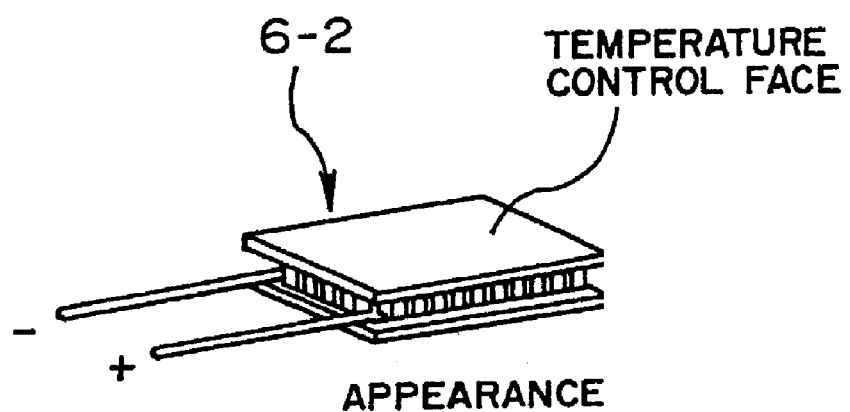
FIG. 11 is a schematic perspective view showing a Peltier element according to the fourth embodiment of the present invention.
Figure 12:
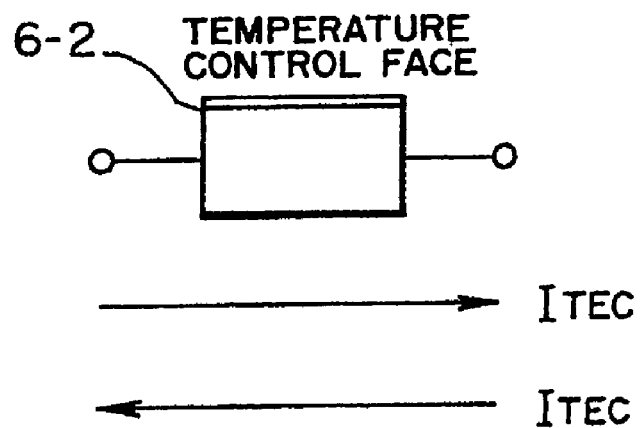
FIG. 12 is a diagrammatic view illustrating a characteristic of the Peltier element of FIG. 11.

FIG. 11 shows a Peltier element serving as a thermoelectric cooling element which can be used for the thermoelectric control element 6-2. In the following, description of the present embodiment proceeds under the assumption that the thermoelectric control element 62 is formed from a Peltier element. Referring to FIG. 11, in the Peltier element 6-2 shown, when current flows through a junction between two metals, a phenomenon that heat is generated or absorbed occurs. Further, as seen in FIG. 12, if heat is generated from the Peltier element 6-2 when current flows in a certain direction, then if the direction of current is reversed, then heat is absorbed.

Referring back to FIG. 10, the automatic temperature control circuit 7 outputs a control signal based on temperature information detected by the thermistor 6-1 to the thermoelectric control element 6-2 to control the thermoelectric control element 6-2 so that the environment temperature may be stabilized at a reference temperature set in advance.

Figure 13:
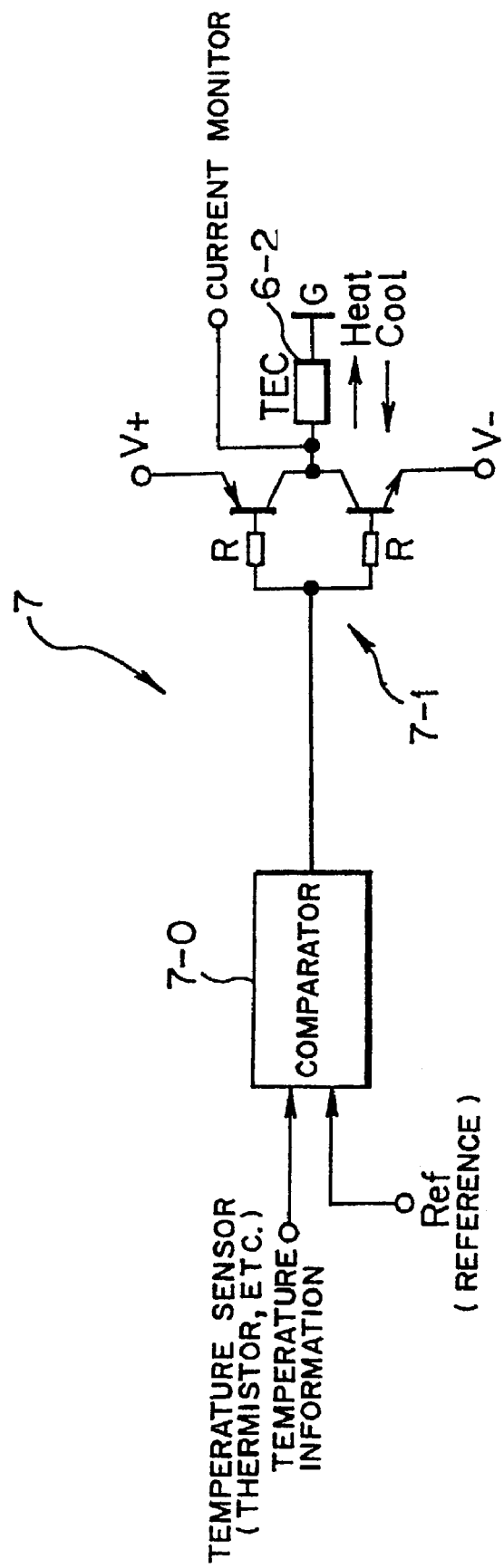
FIG. 13 is a block diagram showing an automatic temperature control circuit according to the fourth embodiment of the present invention.

FIG. 13 shows in block diagram the automatic temperature control circuit 7. Referring to FIG. 13, the automatic temperature control circuit 7 includes, as principal components thereof, a comparator 7-0, and a current control circuit 7-1 formed from resisters and transistors.

The comparator 7-0 compares temperature information from the thermistor 6-1 with a reference value set in advance and sends out a result of the comparison to the thermoelectric control element 6-2 and the detector 10 through the current control circuit 7-1. Consequently, the thermoelectric control element 6-2 performs absorption/emission of heat based on a current value applied as the result of the comparison thereto through the current control circuit 7-1.

In this manner, the automatic temperature control circuit 7 exhibits a function as a temperature control section for controlling the thermoelectric control element 6-2 so that the environment temperature may be stabilized at a reference temperature set in advance by outputting a control signal as a current value to the thermoelectric control element 6-2 based on temperature information detected by the thermistor 6-1.

Referring back to FIG. 10, the ambient temperature supervision circuit 8 which functions as an ambient temperature detector detects the ambient temperature of the laser diode module 6. It is to be noted that use of the ambient temperature supervision circuit 8 outside the light source allows temperature detection with comparatively high reliability since the limitation in size is much more moderate and a temperature detector which is high in stability such as, for example, a platinum resistance thermometer can be used for it.

The automatic current control circuit 9 controls driving current to be supplied to the laser diode 6-0 so that it may be fixed, and includes, for example, a comparator 9-1, a transistor 9-2 and so forth as hereinafter described with reference to FIG. 17. It is to be noted that the automatic current control circuit 9 described above may be replaced by an automatic power control (APC) circuit for supervising the optical power of the main signal system and controlling the optical power so as to be stabilized.

The detector 10 detects an abnormal condition of the laser diode module 6 based on a control signal from the automatic temperature control circuit 7 to the thermoelectric control element 6-2 and ambient temperature information detected by the ambient temperature supervision circuit 8.

Figure 14:
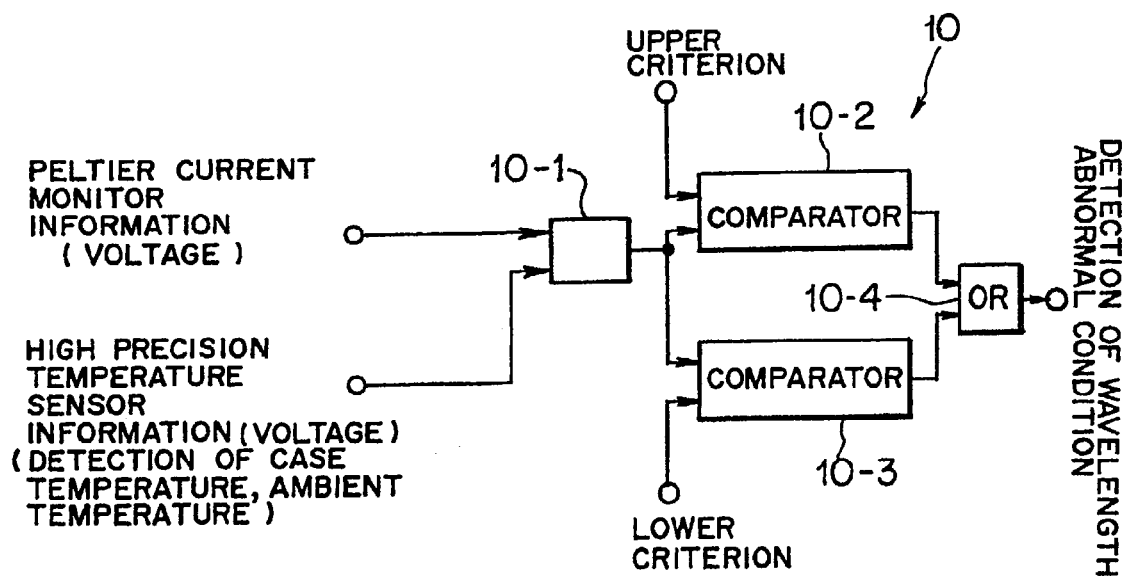
FIG. 14 is a block diagram showing a detector according to the fourth embodiment of the present invention.

FIG. 14 shows in block diagram the detector 10 employed in the wavelength multiplexing transmission apparatus 400A according to the fourth embodiment. Referring to FIG. 14, the detector 10 shown includes an adder 10-1, a pair of comparators 10-2 and 10-3, and an OR circuit 10-4.

The adder 10-1 calculates, based on Peltier current monitor information (current value information sent to the Peltier element 6-2) from the automatic temperature control circuit 7 and temperature information detected by the ambient temperature supervision circuit 8, a finite difference between the ambient temperature of the laser diode 6-0 (the environment temperature in the proximity of the laser diode 6-0 in the laser diode module 6) and the ambient temperature of the laser diode module 6.

Figure 15:
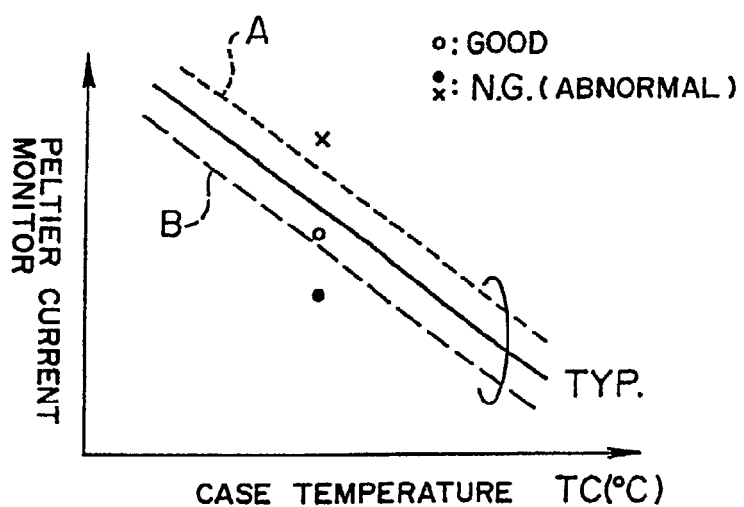
FIG. 15 is a diagram illustrating a relationship between a Peltier current monitor and an ambient temperature and illustrating operation of the detector of FIG. 14.

FIG. 15 illustrates a relationship between the Peltier current monitor value and the ambient temperature. Referring to FIG. 15, the range of the current value (Peltier current monitor value) given to the Peltier element 6-2 with respect to the variation of the ambient temperature (case temperature) of the laser diode module 6 is defined by two broken lines A and B. Any point outside the range between the two broken lines A and B signifies that the value of current which drives the optical signal is abnormal.

In other words, since the relationship between the light source environment temperature (Ta) from the ambient temperature supervision circuit 8 and the consumed current (Peltier current value) of the automatic temperature control circuit 7 serving as a temperature stabilization circuit necessary to stabilize the temperature (TH) of the laser diode 6-0 is known in advance, if the current value goes out of the normal range, then this is detected and determined as a light source temperature abnormal condition. Consequently, this condition can be regarded as a light source wavelength abnormal condition.

Accordingly, in the detector 10, whether or not the Peltier current monitor value remains within the range between the two broken lines A and B can be discriminated by comparison of values by the two comparators 10-2 and 10-3.

The comparator 10-2 compares a finite difference value between voltage information as a Peltier current monitor value and voltage information indicative of the case temperature from the ambient temperature supervision circuit 8 with an upper limit allowable value set in advance. In other words, whether or not the Peltier current monitor value exceeds the level of the broken line A shown in FIG. 15 can be discriminated by the comparator 10-2.

Meanwhile, the comparator 10-3 compares the finite difference value mentioned above with a lower limit allowable value (minus information). Thus, whether or not the Peltier current monitor value is lower than the level of the broken line B shown in FIG. 15 can be discriminated by the comparator 10-3.

If the comparator 10-2 detects that the finite difference value from the adder 10-1 is higher than a predetermined reference value, then it outputs to the OR circuit 10-4 information representing that the light source wavelength is outside its normal range. Meanwhile, if the comparator 10-3 detects that the finite difference value is lower than another predetermined value (minus information), then it outputs to the OR circuit 10-4 information representing that the light source wavelength is outside its normal range.

If a signal representing an abnormal condition is inputted from at least one of the comparators 10-2 and 10-3, then the OR circuit 10-4 detects a wavelength abnormal condition and outputs information representing this.

As described above, the detector 10 functions as a fourth abnormal condition detecting section for detecting an abnormal condition of the laser diode module 6 based on a control signal from the automatic temperature control circuit 7 to the thermoelectric control element 6-2 and ambient temperature information detected by the ambient temperature supervision circuit 8.

By the way, a factor by which a finite difference value or the like of the current value is caused resides in that an error in temperature detection value is caused by deterioration of the resistance of the thermistor 6-1 or the like. In this instance, since the control of the ambient temperature of the laser diode 6-0 by the automatic temperature control circuit 7 comes out of such a control system that an optical signal of a desired wavelength can be outputted from the laser diode 6-0, a wavelength abnormal condition can be detected indirectly from the error of the temperature detection value.

The automatic temperature control circuit 7 of the optical signal outputting section 400 in the wavelength multiplexing transmission apparatus 400A according to the fourth embodiment having the construction described above controls the current to flow through the thermoelectric control element 6-2 in order to make the environment temperature of the laser diode 6-0 fixed based on temperature information detected by the thermistor 6-1.

Further, the detector 10 discriminates, based on temperature control information to the Peltier element 6-2 inputted from the automatic temperature control circuit 7 and ambient temperature information of the laser diode module 6 detected by the ambient temperature supervision circuit 8, whether or not the optical signal remains within the range in which it is allowable as normal with respect to a control amount of the temperature of the laser diode 6-0. If the optical signal is outside the allowable range, the detector 10 detects that the optical wavelength from the laser diode 6-0 at the environment temperature suffers from some displacement.

In this manner, with the wavelength multiplexing transmission apparatus 400A of the fourth embodiment of the present invention, since each of the optical signal outputting sections 400 includes the automatic temperature control circuit 7, ambient temperature supervision circuit 8 and detector 10, by detecting an abnormal condition by supervision of the ambient temperature by the ambient temperature supervision circuit 8 and supervision of the automatic temperature control circuit 7 and thermistor 6-1 provided for wavelength stabilization of the laser diode 6-0 taking a known relationship between the environment temperature of the laser diode 6-0 and the current consumed by the automatic temperature control circuit 7 into consideration, a wavelength abnormal condition can be detected indirectly while control information from an existing wavelength stabilization control mechanism and information representing that a wavelength abnormal condition has been detected is outputted. Consequently, a countermeasure can be taken immediately against the wavelength abnormal condition.

e. Fifth Embodiment

Referring back to FIG. 27, also a wavelength multiplexing transmission apparatus 500A according to a fifth embodiment of the present invention is constructed, similarly to the wavelength multiplexing transmission apparatus 100A of the first embodiment described above, such that a plurality of different optical wavelengths (of the 1.55 μm band) are multiplexed in a high density by a wavelength multiplexing section 50 so that a multiplex signal can be outputted at a transmission rate of, for example, approximately 600 MHz or more. However, the wavelength multiplexing transmission apparatus 500A includes, in place of the optical signal transmission sections 100 of the wavelength multiplexing transmission apparatus 100A of the first embodiment described above, a plurality of optical signal transmission sections 500 which are different from the optical signal transmission sections 100.

Figure 16:
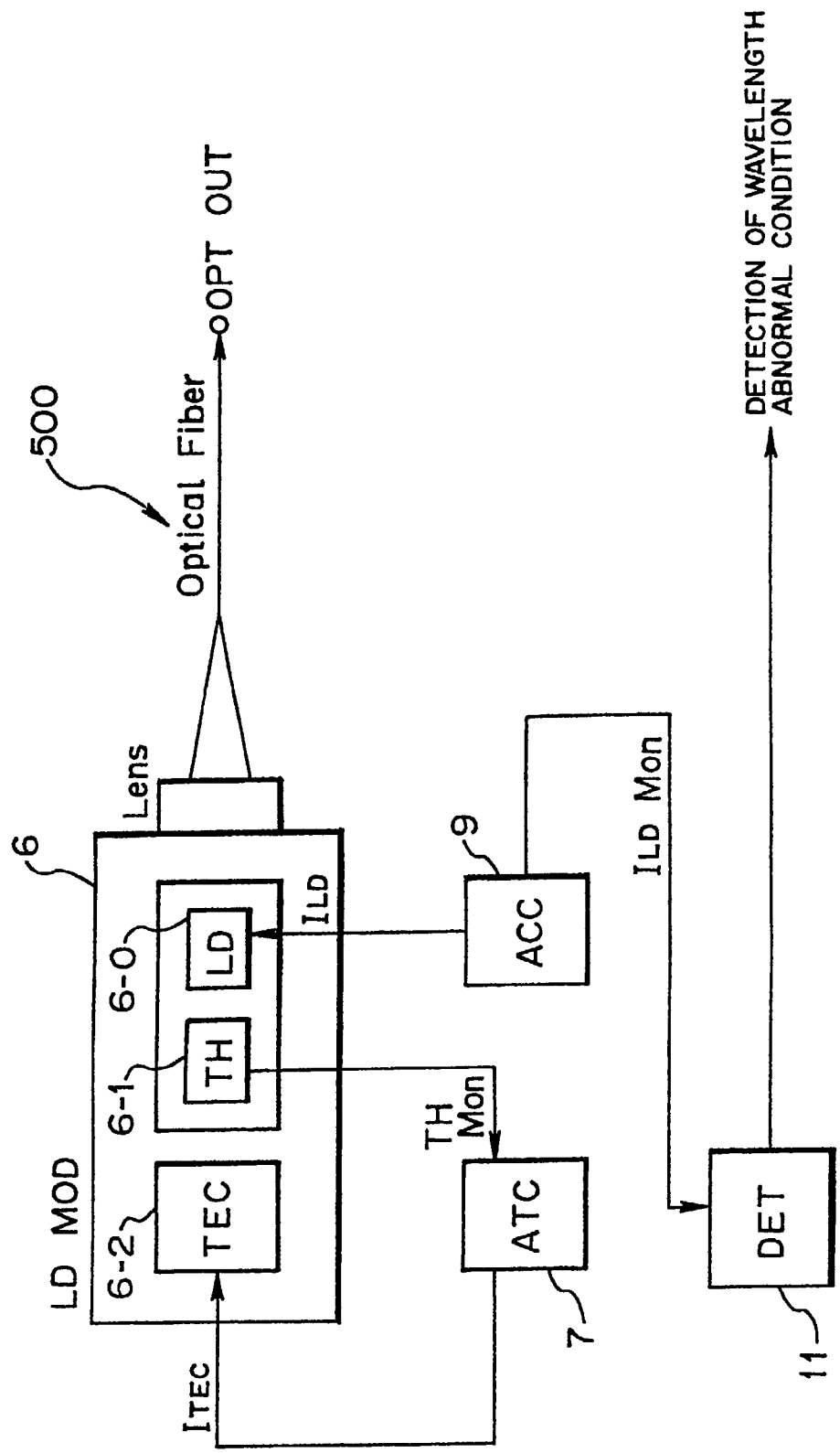
FIG. 16 is a block diagram showing an optical signal outputting section according to a fifth embodiment of the present invention.

FIG. 16 shows a construction of each of the optical signal transmission sections 500 employed in the wavelength multiplexing transmission apparatus 500A according to the fifth embodiment. Referring to FIG. 16, the optical signal transmission section 500 shown is similar in construction to but different from the optical signal outputting section 400 of the wavelength multiplexing transmission apparatus 400A of the fourth embodiment in that it includes a detector 11 in place of the ambient temperature supervision circuit 8 and the detector 10 in addition to the components 6, 6-0, 6-1, 6-2, 7 and 9 described hereinabove.

It is to be noted that overlapping description of the common components (6, 6-0, 6-1, 6-2, 7 and 9) to those of the fourth embodiment is omitted here to avoid redundancy.

The detector 11 detects based on current information from the automatic current control circuit 9 whether or not some displacement in wavelength occurs.

Figure 17:
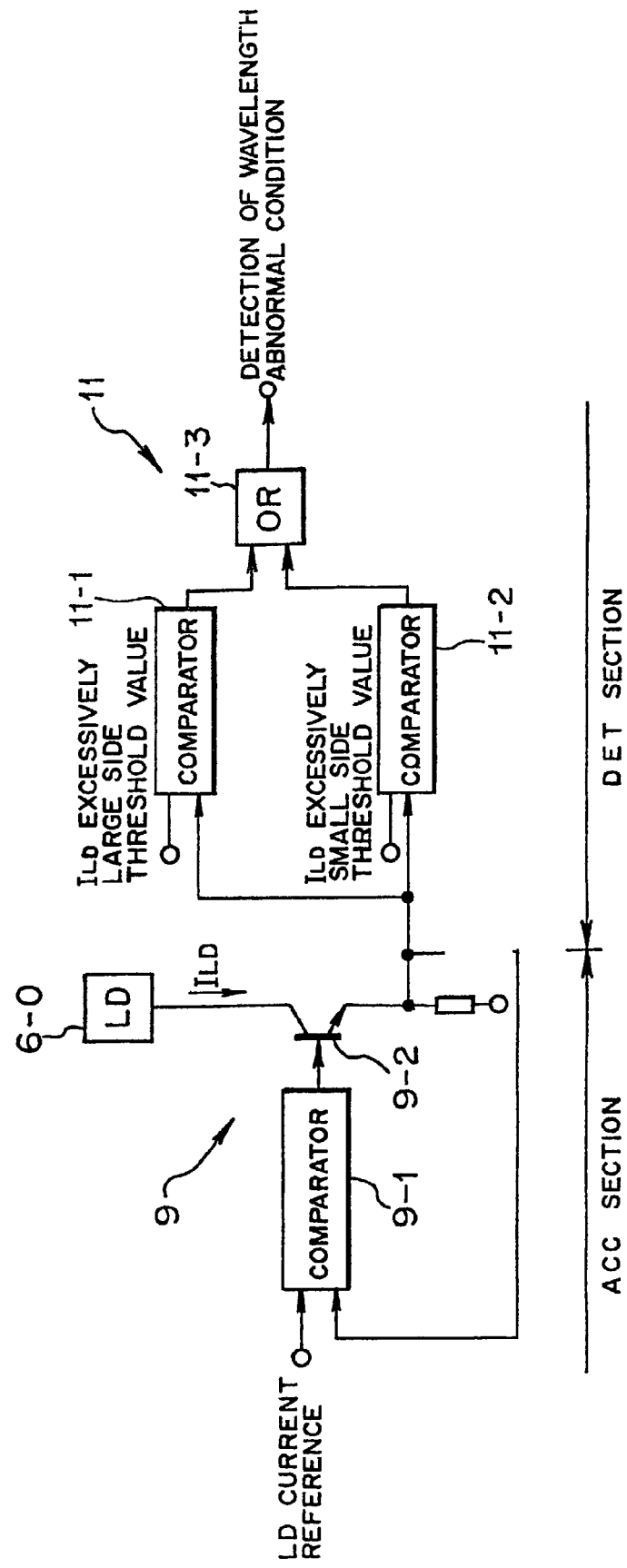
FIG. 17 is a block diagram showing an automatic current control circuit and a detector according to the fifth embodiment of the present invention.

FIG. 17 shows in block diagram the automatic current control circuit 9 and the detector 11 employed in each of the optical signal transmission sections 500 of the wavelength multiplexing transmission apparatus 500A according to the fifth embodiment. Referring to FIG. 17, the automatic current control circuit 9 shown includes a comparator 9-1 and a transistor 9-2.

The comparator 9-1 controls driving current to the laser diode 6-0 through the transistor 9-2 using a driving current value for causing the laser diode 6-0 to output a predetermined optical wavelength as a reference value. In other words, the automatic current control circuit 9 functions as a driving signal control section for controlling an electric signal to be used to drive the laser diode 6-0 so that the level of the electric signal for driving the laser diode 6-0 may be stabilized at a reference level.

Meanwhile, the detector 11 includes a pair of comparators 11-1 and 11-2 and an OR circuit 11-3 and discriminates whether or not the driving current from the automatic current control circuit 9 is at a desired level and whether or not the driving current value is within a normal range.

The comparator 11-1 uses an ordinary driving current value and an allowable maximum current value as reference values for comparison and discriminates whether or not the driving current from the automatic current control circuit 9 is higher than the reference values. Meanwhile, the comparator 11-2 uses a normal driving current value and an allowable minimum current value as reference values for comparison.

If a signal representing that the driving current value is higher than the high reference values is received from the comparator 11-1 or another signal representing that the driving current value is lower than the reference values is received from the comparator 11-2, then the OR circuit 11-3 outputs a detection signal representing a wavelength abnormal condition.

In each of the optical signal transmission sections 500 of the wavelength multiplexing transmission apparatus 500A according to the fifth embodiment having the construction described above, the laser diode module 6 is driven by an electric signal of current to flow under the current control of the automatic current control circuit 9 and outputs an optical wavelength at a fixed level. Meanwhile, the detector 11 discriminates, based on driving current information using the reference values set in advance, whether or not the driving current value is at a level within the normal range.

More particularly, the OR circuit 11-3 outputs a detection signal of a wavelength abnormal condition if it receives either information representing that the driving current value from the comparator 11-1 is higher than the maximum driving current value in the normal range or information representing that the driving current value of the comparator 11-2 is lower than the minimum driving current value in the normal range.

The detector 11 exhibits, due to the provision of the comparators 11-1 and 11-2 and the OR circuit 11-3 as described above, a function as a fifth abnormal condition detecting section which detects an abnormal condition of an optical signal outputted from the laser diode 6-0 based on current value information to be used for driving the laser diode 6-0 which is controlled by the automatic current control circuit 9.

In this manner, with the wavelength multiplexing transmission apparatus 500A according to the fifth embodiment of the present invention, since each of the optical signal transmission sections 500 includes the automatic current control circuit 9 and the detector 11, by supervising the driving current of the laser diode 6-0 based on the fact that the driving current and the output wavelength of the laser diode 6-0 have a one-by-one corresponding relationship, if, except upon initial starting, the driving current is displaced from a predetermined value because of deterioration of the laser diode 6-0 as time passes, then this can be detected as a wavelength abnormal condition of the laser diode 6-0, and besides, since a signal representing that a wavelength abnormal condition is detected is outputted, a countermeasure can be taken immediately against the wavelength abnormal condition.

f. Sixth Embodiment

Referring to FIG. 27, also a wavelength multiplexing transmission apparatus 600A according to a sixth embodiment of the present invention is constructed, similarly to the wavelength multiplexing transmission apparatus 100A of the first embodiment described above, such that a plurality of different optical wavelengths (of the 1.55 μm band) are multiplexed in a high density by a wavelength multiplexing section 50 so that a multiplex signal can be outputted at a transmission rate of, for example, approximately 600 MHz or more. However, the wavelength multiplexing transmission apparatus 600A includes, in place of the optical signal transmission sections 100 of the wavelength multiplexing transmission apparatus 100A of the first embodiment described above, a plurality of optical signal outputting sections 600 which are different from the optical signal transmission sections 100.

Figure 18:
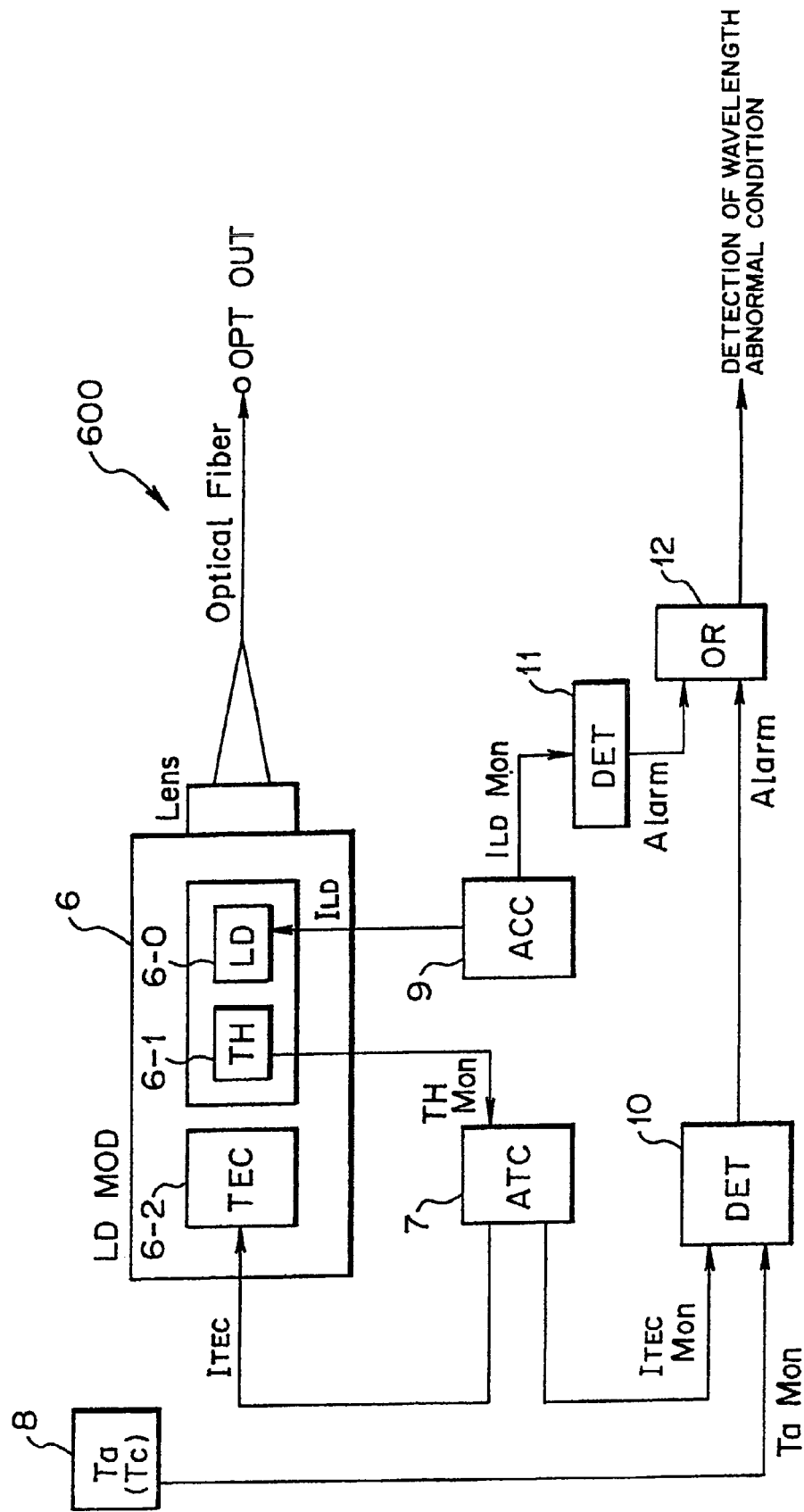
FIG. 18 is a block diagram showing an optical signal outputting section according to a sixth embodiment of the present invention.

FIG. 18 shows a construction of each of the optical signal outputting sections 600 employed in the wavelength multiplexing transmission apparatus 600A according to the sixth embodiment. Referring to FIG. 18, the optical signal outputting section 600 shown is similar in construction to but different from the optical signal outputting section 400 of the wavelength multiplexing transmission apparatus 400A of the fourth embodiment in that it includes functions as the detector 11 employed in the fifth embodiment and an OR circuit 12 in addition to the components 6, 6-0, 6-1, 6-2, 7, 8, 9, 10 and 11 described hereinabove.

It is to be noted that overlapping description of the common components (6, 6-0, 6-1, 6-2, 7 and 9) to those of the fourth and fifth embodiments is omitted here to avoid redundancy.

The OR circuit 12 outputs wavelength abnormal condition detection information when it receives a report of wavelength abnormal condition detection from either one of the detectors 10 and 11.

In particular, the OR circuit 12 functions as a sixth abnormal condition detecting section for detecting a wavelength abnormal condition of an optical signal outputted from the laser diode 6-0 when the detector 11 serving as the fifth abnormal condition detecting section or the detector 10 serving as the fourth abnormal condition detecting section detects an abnormal condition.

In each of the optical signal outputting sections 600 of the wavelength multiplexing transmission apparatus 600A according to the sixth embodiment having the construction described above, when a signal representing that an abnormal condition of temperature stabilization control which is caused by deterioration of a resistor as time passes is received from the detector 10, the OR circuit 12 outputs a wavelength abnormal condition detection signal. On the other hand, if another signal representing that a driving current abnormal condition caused by deterioration of the laser diode 6-0 as time passes is received from the detector 11, then the OR circuit 12 outputs a wavelength abnormal condition detection signal.

In this manner, with the wavelength multiplexing transmission apparatus 600A according to the sixth embodiment of the present invention, since each of the optical signal outputting sections 600 includes the detectors 10 and 11 and the OR circuit 12, it can detect a displacement in wavelength of the optical signal by an influence of the temperature caused by deterioration of the thermistor 6-1 as time passes and can detect a displacement in wavelength of the optical signal by discriminating whether or not the driving current value comes out of its normal range as a result of deterioration of the laser diode 6-0 as time passes. Consequently, a countermeasure can be taken immediately against the wavelength displacement.

g. Seventh Embodiment

Referring back to FIG. 27, also a wavelength multiplexing transmission apparatus 700A according to a seventh embodiment of the present invention is constructed, similarly to the wavelength multiplexing transmission apparatus 100A of the first embodiment described above, such that a plurality of different optical wavelengths (of the 1.55 μm band) are multiplexed in a high density by a wavelength multiplexing section 50 so that a multiplex signal can be outputted at a transmission rate of, for example, approximately 600 MHz or more. However, the wavelength multiplexing transmission apparatus 700A includes, in place of the optical signal transmission sections 100 of the wavelength multiplexing transmission apparatus 100A of the first embodiment described above, a plurality of optical signal outputting sections 700 which are different from the optical signal transmission sections 100.

Figure 19:
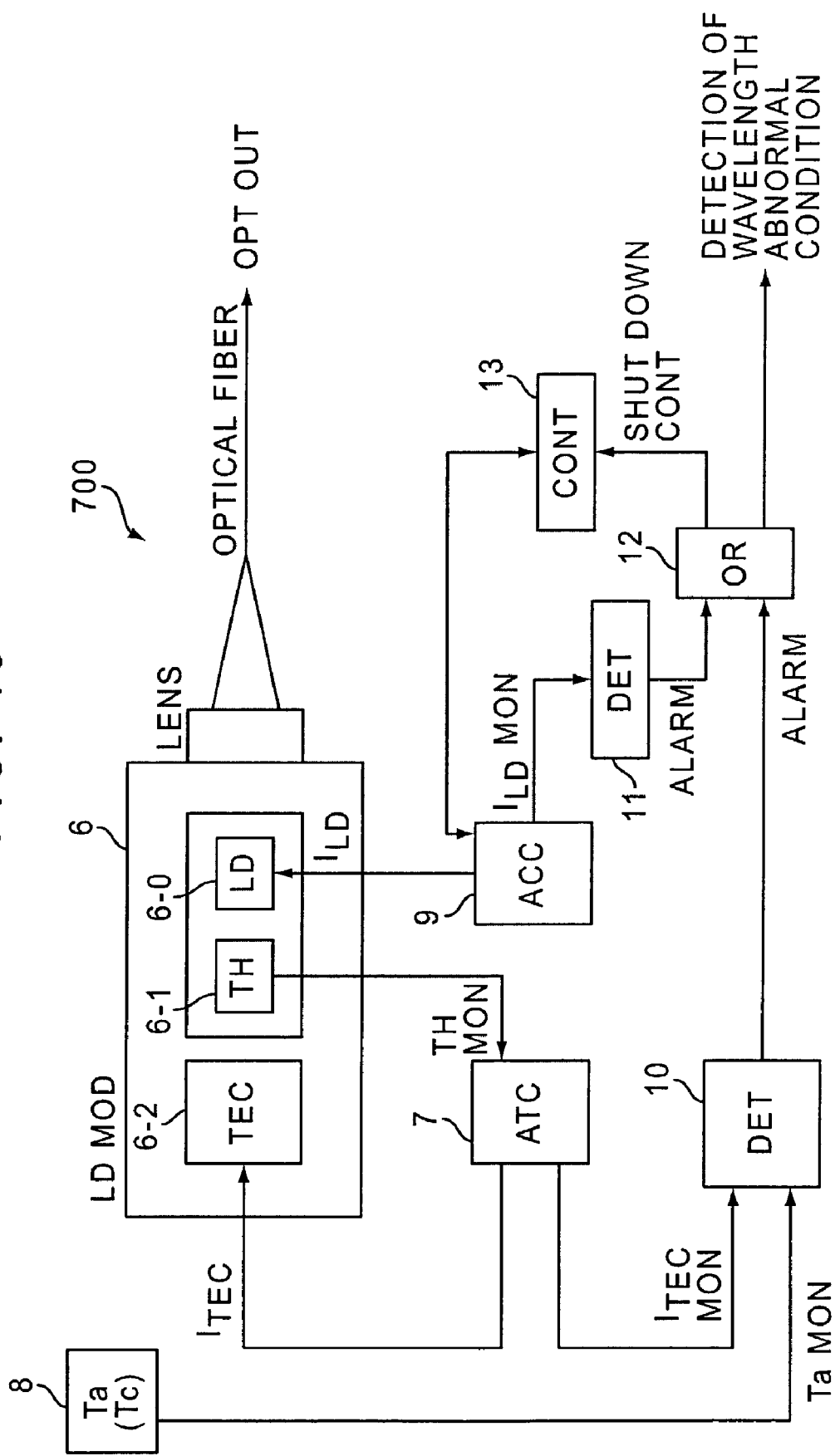
FIG. 19 is a block diagram showing an optical signal outputting section according to a seventh embodiment of the present invention.

FIG. 19 shows a construction of each of the optical signal outputting sections 700 employed in the wavelength multiplexing transmission apparatus 700A according to the seventh embodiment of the present invention. Referring to FIG. 19, the optical signal outputting section 700 shown is similar in construction to but different from the optical signal outputting section 600 of the wavelength multiplexing transmission apparatus 600A of the sixth embodiment in that it includes a shutdown control circuit (CONT) 13 in addition to the components 6, 6-0, 6-1, 6-2, 7, 8, 9, 10 and 11 described hereinabove.

It is to be noted that overlapping description of the common components (6, 6-0, 6-1, 6-2, 7, 8, 9, 10 and 11) to those of the fourth to sixth embodiments is omitted here to avoid redundancy.

The shutdown control circuit 13 controls, when a wavelength abnormal condition is detected by the OR circuit 12, the automatic current control circuit 9 so that supply of driving current to the laser diode 6-0 may be stopped to prevent the optical signal of the laser diode 6-0 from being outputted.

FIG. 20 illustrates a function of the shutdown control circuit 13. Referring to FIG. 20, the shutdown control circuit 13 controls so that the reference value to be used by the comparator 9-1 shown in FIG. 17 may be switched from an LD current reference REF (reference value) to a ground REF.

In each of the optical signal outputting sections 700 of the wavelength multiplexing transmission apparatus 700A according to the seventh embodiment of the present invention having the construction described above, if information of wavelength abnormal condition detection from the OR circuit 12 is received by the shutdown control circuit 13, then since this signifies that an abnormal condition of the laser diode module 6 or the laser diode 6-0 is detected, the shutdown control circuit 13 switches the optical signal, which is outputted from one of the optical signal outputting sections 700 which is thus in an abnormal condition, to the wavelength multiplexing section 50, to an interruption condition.

Since the reference voltage for the comparator 9-1 of the automatic current control circuit 9 is switched to the ground potential, the laser diode 6-0 does not output an optical signal any more.

In this manner, with the wavelength multiplexing transmission apparatus 700A including the optical signal outputting sections 700 according to the seventh embodiment of the present invention, since, when a wavelength abnormal condition is detected, shutdown control is performed by the shutdown control circuit 13 so that an optical signal having a displaced wavelength may not be outputted from the wavelength multiplexing transmission apparatus 100A, a wavelength displacement of the optical signal can be detected, and a countermeasure against the wavelength displacement can be taken immediately to prevent crosstalk with another channel.

g1. Modification to the Seventh Embodiment

Referring to FIG. 27, also a wavelength multiplexing transmission apparatus 750A according to a modification to the seventh embodiment of the present invention is constructed, similarly to the wavelength multiplexing transmission apparatus 100A of the first embodiment described above, such that a plurality of different optical wavelengths (of the 1.55 µm band) are multiplexed in a high density by a wavelength multiplexing section 50 so that a multiplex signal can be outputted at a transmission rate of, for example, approximately 600 MHz or more. However, the wavelength multiplexing transmission apparatus 750A includes, in place of the optical signal transmission sections 100 of the wavelength multiplexing transmission apparatus 100A of the first embodiment described above, a plurality of optical signal outputting sections 750 which are different from the optical signal transmission sections 100.

Figure 21:
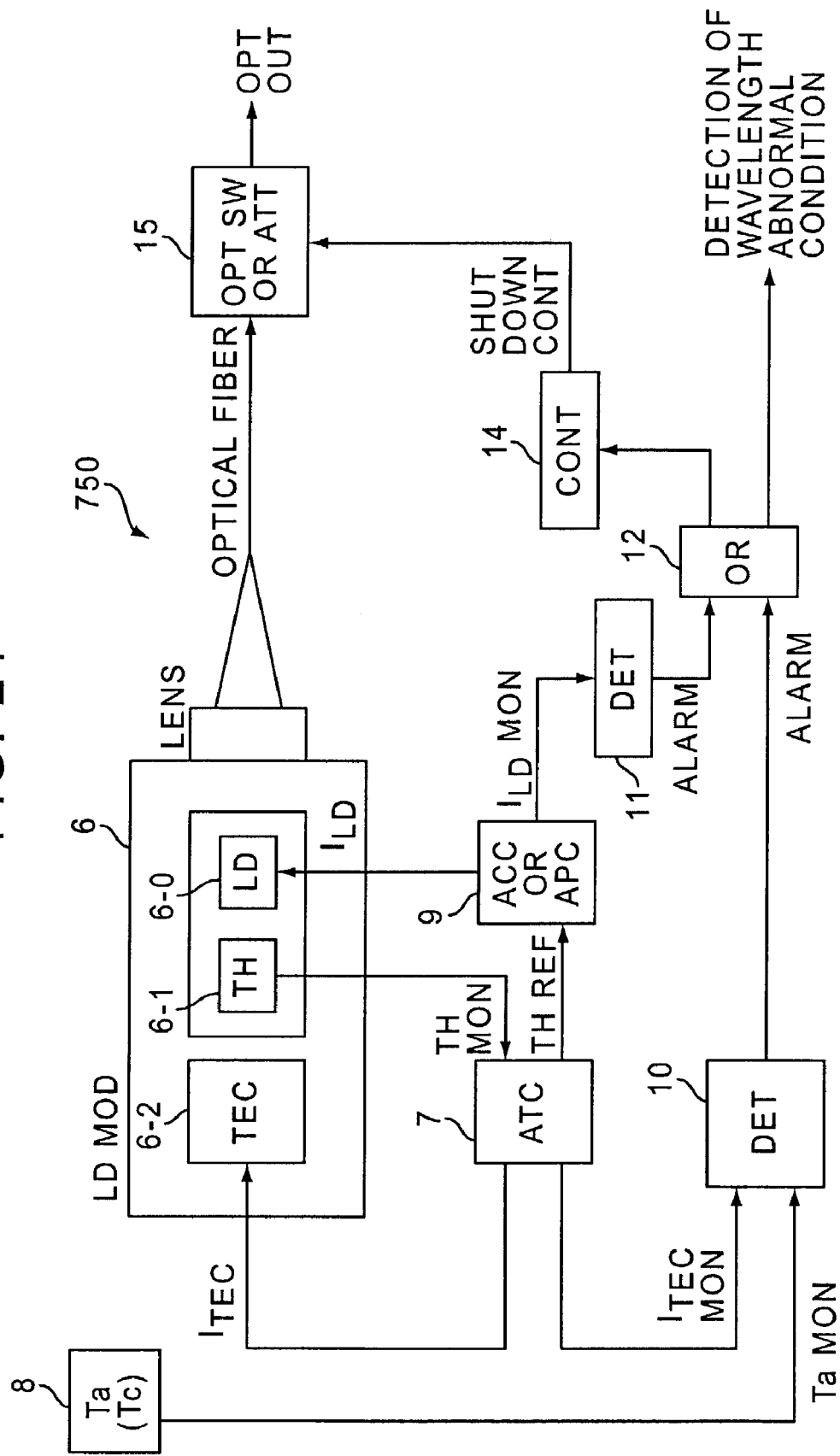
FIG. 21 is a block diagram showing a modification to the optical signal outputting section of FIG. 19.

FIG. 21 shows a construction of each of the optical signal outputting sections 750 employed in the wavelength multiplexing transmission apparatus 750A according to the modification to the seventh embodiment of the present invention. Referring to FIG. 21, the optical signal outputting section 750 shown is similar in construction to but different from the optical signal outputting section 700 of the wavelength multiplexing transmission apparatus 700A of the seventh embodiment in that it includes an optical switch (OPT SW or ATT) 15 and includes, in place of the shutdown control circuit 13, a shutdown control circuit (CONT) 14 in addition to the other components 6, 6-0, 6-1, 6-2, 7, 8, 9, 10, 11 and 12 described hereinabove.

It is to be noted that overlapping description of the common components (6, 6-0, 6-1, 6-2, 7, 8, 9, 10, 11 and 12) to those of the fourth to seventh embodiments is omitted here to avoid redundancy.

The optical switch 15 serves as an attenuator (transducer) which changes the transmission direction of an optical signal or attenuates the optical output level. It is to be noted that the function as the optical switch 15 just mentioned can be realized by an attenuator.

The shutdown control circuit 14 prevents, when a wavelength abnormal condition is detected, an optical signal from the laser diode 6-0, which suffers from wavelength displacement, from arriving at the receiving side similarly to the shutdown control circuit 13. Whereas the shutdown control circuit 13 puts the driving current to the laser diode 6-0 into an interruption condition, the shutdown control circuit 14 puts the optical signal itself of the main signal system into an interruption condition.

Here, the shutdown control circuit 14 controls the optical switch 15 disposed in series to the output of the laser diode 6-0 in order to put the optical signal outputted from the laser diode 6-0 into an interruption condition intermediately.

In each of the optical signal outputting sections 750 of the wavelength multiplexing transmission apparatus 750A according to the modification to the seventh embodiment having the construction described above, if the shutdown control circuit 14 receives from the OR circuit 12 information representing that an abnormal condition of the laser diode module 6 or the laser diode 6-0 is detected, then the shutdown control circuit 14 controls the optical switch 15 so that the optical signal outputted from the optical signal outputting section 750 may be put into an interruption condition.

The optical switch 15 switches, under the control of the shutdown control circuit 14, the optical signal from the laser diode 6-0 to another route so that the optical signal may not be passed to the route of the main signal system or the output level of the signal may be attenuated to such a degree that the signal cannot be received by attenuation control in the attenuator.

In this manner, with the wavelength multiplexing transmission apparatus 750A including the optical signal outputting sections 750 according to the modification to the fifth embodiment of the present invention, since it includes the shutdown control circuit 14, when a wavelength abnormal condition is detected, shut-down control of the optical switch 15 is performed so that an optical signal from the laser diode 6-0 having a wavelength in a displaced condition may not arrive at the optical switch 15 from the wavelength multiplexing transmission apparatus 750A. Consequently, a wavelength displacement of the optical signal can be detected, and a countermeasure against the wavelength displacement can be taken immediately to prevent crosstalk with another channel.

h. Eighth Embodiment

A wavelength demultiplexing reception apparatus 800 according to an eighth embodiment of the present invention is provided corresponding to the optical signal transmission section 100 and other apparatus of the first embodiment and so forth described above wherein wavelengths outputted from a plurality of optical signal transmission sections 100 and different from each other are multiplexed by and outputted from the wavelength multiplexing section 50. The wavelength demultiplexing reception apparatus 800 thus receives, as an input signal thereto, a multiplex signal multiplexed in a high density at a transmission rate of, for example, 600 MHz or more.

Figure 22:
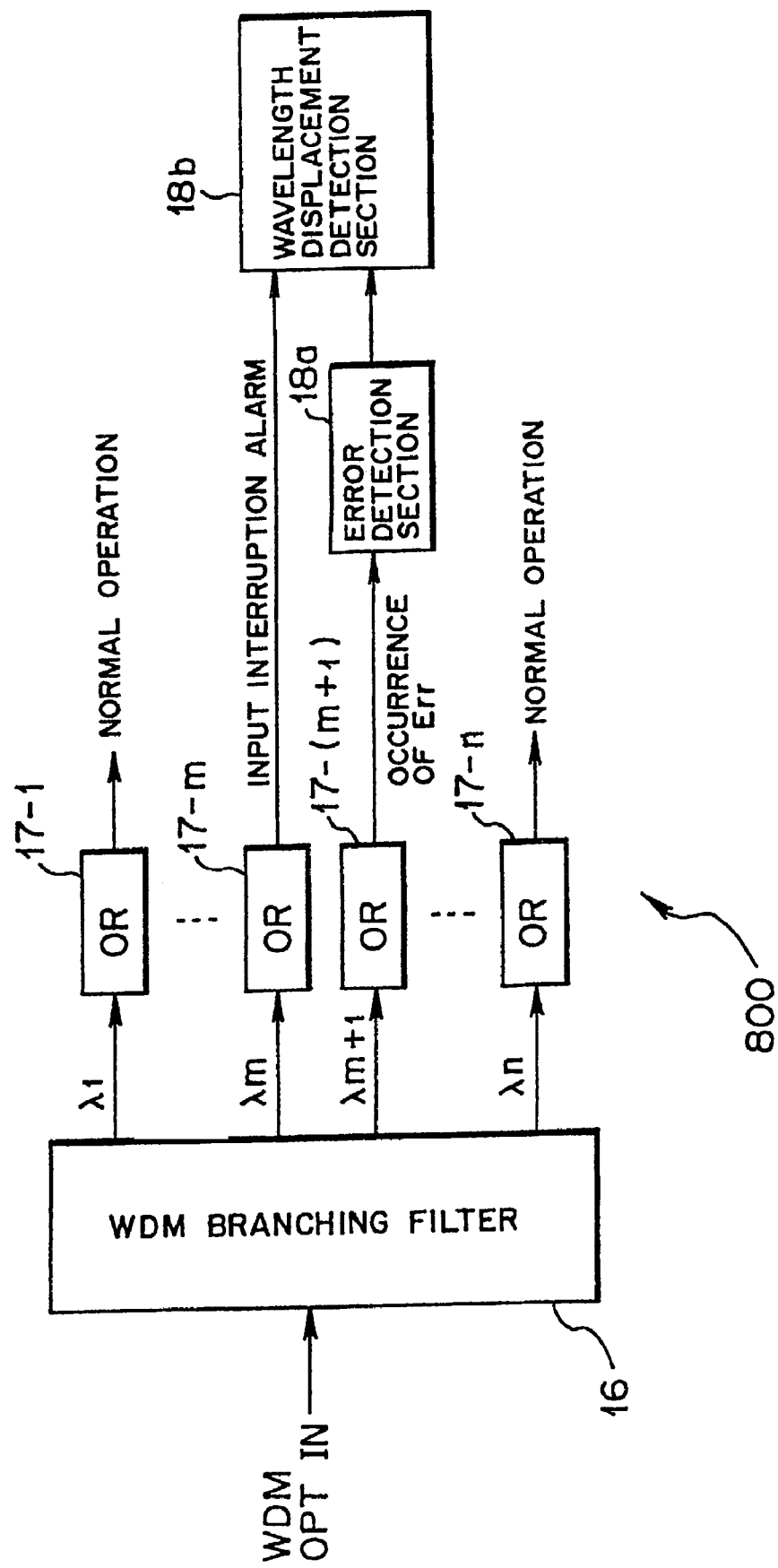
FIG. 22 is a block diagram showing a wavelength demultiplexing reception apparatus according to an eighth embodiment of the present invention.

FIG. 22 shows, in block diagram, the wavelength demultiplexing reception apparatus 800 according to the eighth embodiment. Referring to FIG. 22, the wavelength demultiplexing reception apparatus 800 includes a WDM branching filter 16, n photo-electric converters or optical receivers 17-1 to 17-n (n is a natural number), an error detecting section 18a, and a wavelength displacement detecting section 18b.

The WDM branching filter 16 branches a multiplex signal sent thereto for individually different wavelengths. The optical receivers 17-1 to 17-n convert the branched optical signals (having wavelengths $\lambda 1$ to $\lambda n$; in the following description, $\lambda 1$ to $\lambda n$ may represent the optical signals) into electric signals for the individual wavelengths. Thus, the number of the optical receivers 17-1 to 17-n is equal to the number of the different wavelengths.

Figure 23:
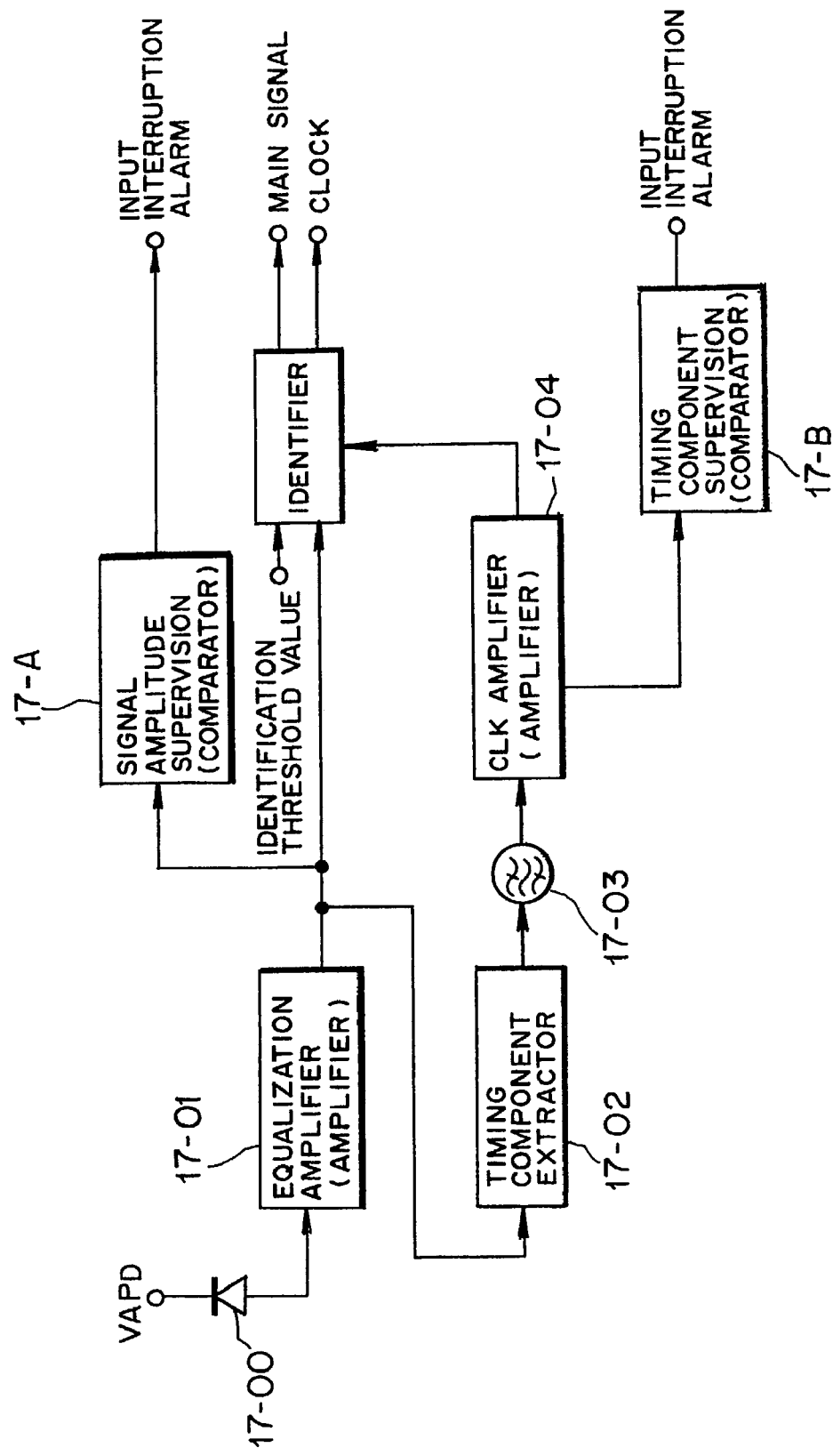
FIG. 23 is a block diagram showing an optical receiver according to the eighth embodiment of the present invention.

FIG. 23 shows in block diagram a construction of each of the optical receivers 17-1 to 17-n. Referring to FIG. 23, each of the optical receivers 17-1 to 17-n shown includes a photodiode 17-00 serving as a light reception element, an amplifier 17-01 which performs equivalent amplification processing, a comparator 17A, a timing component extractor 17-02, a filter 17-03, and an amplifier 17-04 which performs clock amplification processing. Or, a comparator 17-B is provided in place of the comparator 17-A.

The comparators 17-A supervise the signal amplitudes of the respectively received optical signals $\lambda 1$ to $\lambda n$ and compare the output levels of the optical signals $\lambda 1$ to $\lambda n$ with reference value levels set in advance.

Meanwhile, the comparators 17-B supervise timing components and compare the timings extracted from the respectively received optical signals $\lambda 1$ to $\lambda n$ with reference timings set in advance.

Referring back to FIG. 22, the error detecting section 18a discriminates whether or not a received signal includes data in a predetermined format.

The wavelength displacement detecting section 18b detects input interruption alarm information and error detection information to detect a wavelength abnormal condition and is formed from, for example, an OR circuit.

With the wavelength demultiplexing reception apparatus 800 according to the eighth embodiment having the construction described above, the WDM branching filter 16 demultiplexes wavelength multiplex light for a plurality of individually different wavelengths. It is to be noted that operation here is described assuming that an optical signal $\lambda m$ (m is a natural number) demultiplexed from the multiplex signal by the WDM branching filter 16 is displaced to the optical signal $\lambda m+1$ side.

The optical signal A m demultiplexed from the multiplex signal by the WDM branching filter 16 is converted into an electric signal by the photodiode 17-00 of the optical receiver 17-m, and the electric signal is equivalently amplified by the amplifier 17-01.

If the comparator 17-A detects, during supervision of the signal amplitude, that the electric signal level from the amplifier 17-01 does not reach a predetermined reference value level, then it outputs an input interruption alarm signal.

Meanwhile, the comparator 17-B outputs, if an extracted timing component during supervision of the timing component exhibits some displacement from a predetermined reference timing, an input interruption alarm signal.

Here, one of the comparator 17-A and the comparator 17-B can be selectively used to effect detection of interruption of an input.

In this manner, each of the optical receivers 17-1 to 17-n exhibits a function as a light receiving section which includes the comparator 17-A (or 17-B) serving as an interruption condition detecting section which supervises information of an electric signal into which an optical signal of a pertaining wavelength demultiplexed by the WDM branching filter 16 and received by the pertaining photodiode 17-00 is converted by the photodiode 17-00 to discriminate whether or not the input is in an interruption condition.

Further, if the optical signal $\lambda m$ is displaced toward the optical signal $\lambda m+1$ side, then the information data of the optical signal $\lambda m$ overlaps, in the error detecting section 18a, with information data of the optical $\lambda m+1$ obtained by conversion by the optical receiver 17-(m+1). In this instance, data information having a predetermined format as a received signal, for example, frame data, cannot be recognized, and consequently, an error (Err) is detected.

Consequently, the error detecting section 18a exhibits a function of an error detecting section which detects an error with reference to the predetermined format in regard to data included in a signal after conversion into an electric signal by the optical receiver 17-(m+1).

Meanwhile, the wavelength displacement detecting section 18b detects a wavelength displacement from the input interruption alarm signal from the optical receiver 17-n and the error detection signal from the error detecting section 18a of an adjacent channel.

Accordingly, the wavelength displacement detecting section 18b exhibits a function as a first transmission side wavelength abnormal condition detecting section.

It is to be noted that, if the wavelengths of the optical signals $\lambda 1$ and $\lambda n$ are displaced in directions away from the wavelength range, then only an input interruption alarm signal is outputted. In this instance, discrimination which includes alarm information and so forth of the transmitter is required.

In this manner, with the wavelength demultiplexing reception apparatus 800 according to the eighth embodiment of the present invention, since it includes the optical receivers 17-1 to 17-n, error detecting sections 18a and wavelength displacement detecting sections 18b, an input disconnection alarm signal can be sent out and detection of an error can be performed to detect a wavelength abnormal condition based on information of electric signals obtained by conversion of the optical signals $\lambda 1$ to $\lambda m$ by the optical receivers 17-1 to 17-n, and consequently, a countermeasure against the abnormal condition can be taken immediately.

i. Ninth Embodiment

A wavelength demultiplexing reception apparatus 900 according to a ninth embodiment of the present invention is provided, similarly to the wavelength demultiplexing reception apparatus 800 of the eighth embodiment described above, corresponding to the apparatus described above including the optical signal transmission section 100 of the first embodiment wherein wavelengths outputted from a plurality of optical signal transmission sections 100 and different from each other are multiplexed by and outputted from the wavelength multiplexing section 50. The wavelength demultiplexing reception apparatus 900 thus receives, as an input signal thereto, a multiplex signal multiplexed in a high density at a transmission rate of, for example, 600 MHz or more.

Figure 24:
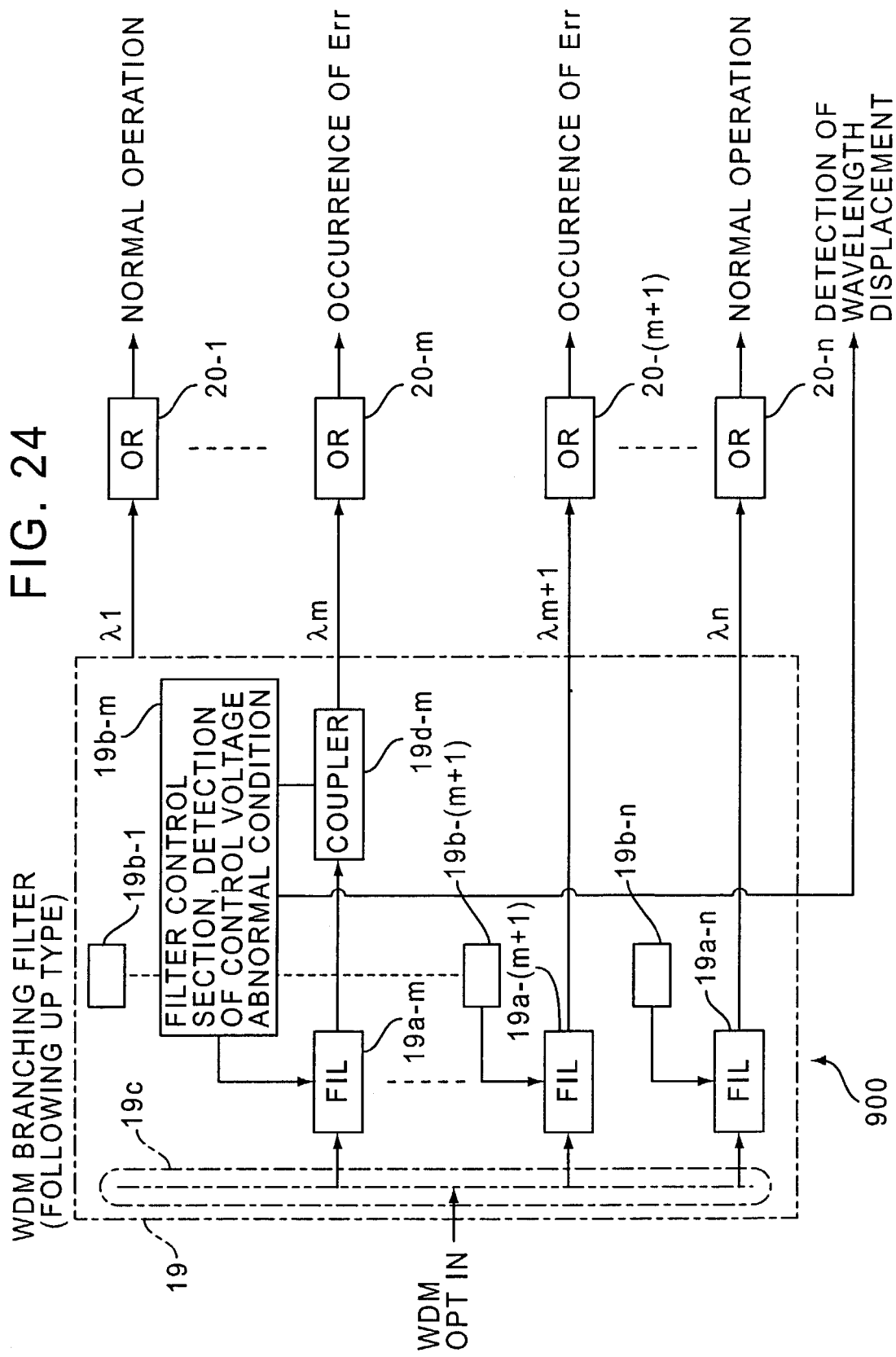
FIG. 24 is a block diagram showing a wavelength demultiplexing reception apparatus according to a ninth embodiment of the present invention.

FIG. 24, shows, in block diagram, the wavelength demultiplexing reception apparatus 900 according to the ninth embodiment of the present invention. Referring to FIG. 24, the wavelength demultiplexing reception apparatus 900 includes a WDM branching filter 19, and optical receivers (OR) 20-1 to 20-n.

The WDM branching filter 19 includes filters (FIL) 19a-1 to 19a-n, filter (FIL) control sections 19b-1 to 19b-n, a power branching section 19c, and couplers 19d-1 to 19d-n.

Each of the filters 19a-1 to 19a-n has a variable transmission optical wavelength band for extracting a predetermined wavelength (one of the wavelengths $\lambda 1$ to $\lambda n$) set in advance. The filters 19a-1 to 19a-n thus extract the respective predetermined wavelengths following up variations in wavelength of a received optical signal under the control of the filter control sections 19b-1 to 19b-n which will be hereinafter described.

The power branching section 19c branches a multiplex signal from the transmission side (wavelength multiplexing transmission apparatus 100A) into a number of optical powers equal to the number of the filters 19a-1 to 19a-n. Optical signals obtained by power branching by the power branching section 19c include the optical wavelengths $\lambda 1$ to $\lambda n$ and are introduced into the filters 19a-1 to 19a-n, respectively.

Each of the filter control sections 19b-1 to 19b-n functions as a filter control section and performs voltage control of a corresponding one of the filters 19a-1 to 19a-n so that it may extract the respective predetermined optical wavelength.

Figure 25:
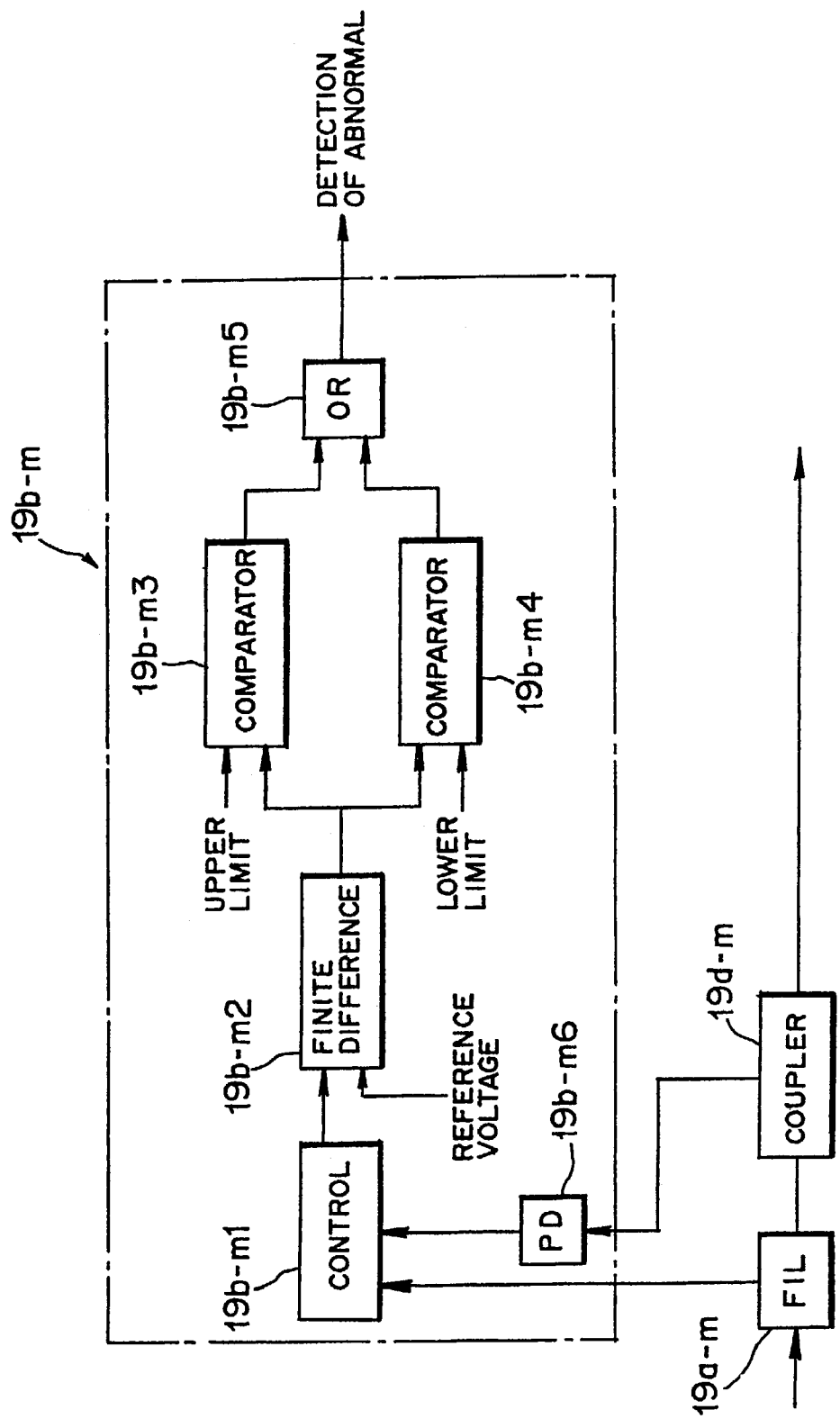
FIG. 25 is a block diagram showing a filter control section according to the ninth embodiment of the present invention.

FIG. 25 shows a construction of the filter control section 19b-m in the wavelength demultiplexing reception apparatus 900 according to the ninth embodiment of the present invention. Referring to FIG. 25, the filter control section 19b-m shown includes a control section 19b-m1, a finite difference detector 19b-m2, a comparator 19b-m3, another comparator 19b-m4, an OR circuit 19b-m5, and a photodiode 19b-m6. It is to be noted that also the other filter control sections 19b-1 to 19b-(m−1) and filter control sections 19b-(m+1) to 19b-n have a similar construction to that shown in FIG. 25.

In the following, an abnormal condition detection mechanism where the wavelength $\lambda m$ of an optical signal outputted is displaced toward the wavelength $\lambda m+1$ side is described.

The control section 19b-m1 controls a voltage to be applied to the filter 19a-m. Upon such control, the control section 19b-m1 uses wavelength information obtained by electric conversion by the photodiode 19b-m6 of an output signal from the filter 19a-m received through the coupler 19d-m.

The finite difference detector 19b-m2 calculates a finite difference between information of a voltage to be applied to the filter 19a-m from the control section 19b-m1 and a predetermined reference value. For the predetermined reference value, a voltage value with which the wavelength $\lambda m$ is to be extracted from the filter 19a-m can be used.

The comparator 19b-m3 and the comparator 19b-m4 perform comparison to detect whether or not the displacement from the predetermined reference voltage value remains within a normal range, or in other words, whether or not the finite difference between the control voltage value and the predetermined reference voltage value remains within a range of displacement within which it is allowable as a normal control voltage.

Here, as the allowable range of displacement, the value (+ value) of an upper limit allowable as a normal control voltage is used as a reference voltage for the comparator 19b-m3. Meanwhile, as the allowable range of displacement, the value (− value) of a lower limit allowable as a normal control voltage is used as a reference voltage for the comparator 19b-m4. If the calculated value by the finite difference detector 19b-m2 is in the positive, then comparison by the comparator 19b-m3 is regarded as principal comparison.

If the comparator 19b-m3 discriminates that the displacement mentioned above is larger than the pertaining predetermined reference value, then it outputs this information to the OR circuit 19b-m5. On the other hand, if the comparator 19b-m4 discriminates that the displacement is smaller than the pertaining predetermined reference value, then it outputs this information to the OR circuit 19b-m5.

The optical receivers 20-1 to 20-n shown in FIG. 24 convert optical signals of the wavelengths $\lambda 1$ through $\lambda n$ demultiplexed by the filters 19a-1 to 19a-n into electric signals, respectively.

In the filter control section 19b-m of the wavelength demultiplexing reception apparatus 900 according to the ninth embodiment having the construction described above, the finite difference detector 19b-m2 calculates a finite difference value based on a control voltage value from the control section 19b-m1. Based on the finite difference value, the comparators 19b-m3 and 19b-m4 discriminate whether or not the voltage value to be applied to the filter 19a-m remains within the allowable range to extract the predetermined optical wavelength $\lambda m$. Then, if the OR circuit 19b-m5 receives from the comparator 19b-m3 (or 19b-m4) a signal representing that the control voltage value is outside the allowable range, then it outputs a signal of detection of a wavelength abnormal condition.

Accordingly, the filter control section 19b-m exhibits a function as a second transmission side wavelength abnormal condition detecting section which detects, from among wavelengths of an optical signal for which wavelength multiplexing has been performed on the transmission side, a wavelength with which an abnormal condition occurs in accordance with a control signal outputted from the filter control section control section 19b-m1.

An error detecting section 18a' (not shown) can discriminate whether or not the signal received by the optical receiver 20-m has a data form conforming to a predetermined format, for example, a data form (data frame or the like) in data transmission conforming to a protocol in a communication technique, to detect an error. Such error detection can be performed alternatively on the wavelength $\lambda m+1$ side.

In this manner, with the wavelength demultiplexing reception apparatus 900 according to the ninth embodiment of the present invention, since it includes the filter control section 19b-m, a wavelength displacement can be detected based on voltage value information applied to the filter 19a-m when the predetermined optical wavelength $\lambda m$ is detected, and consequently, a countermeasure against the abnormal condition can be taken immediately.

It is to be noted that, where a filter of the variable wavelength type is used as described above, if the range of the wavelength variation is narrow comparing with the channel distance, the filter operates substantially equivalently to a filter of the fixed wavelength type, and a wavelength displacement can be detected in a similar manner as in the wavelength demultiplexing reception apparatus 800 described hereinabove.

i1. Modification to the Ninth Embodiment

Figure 26:
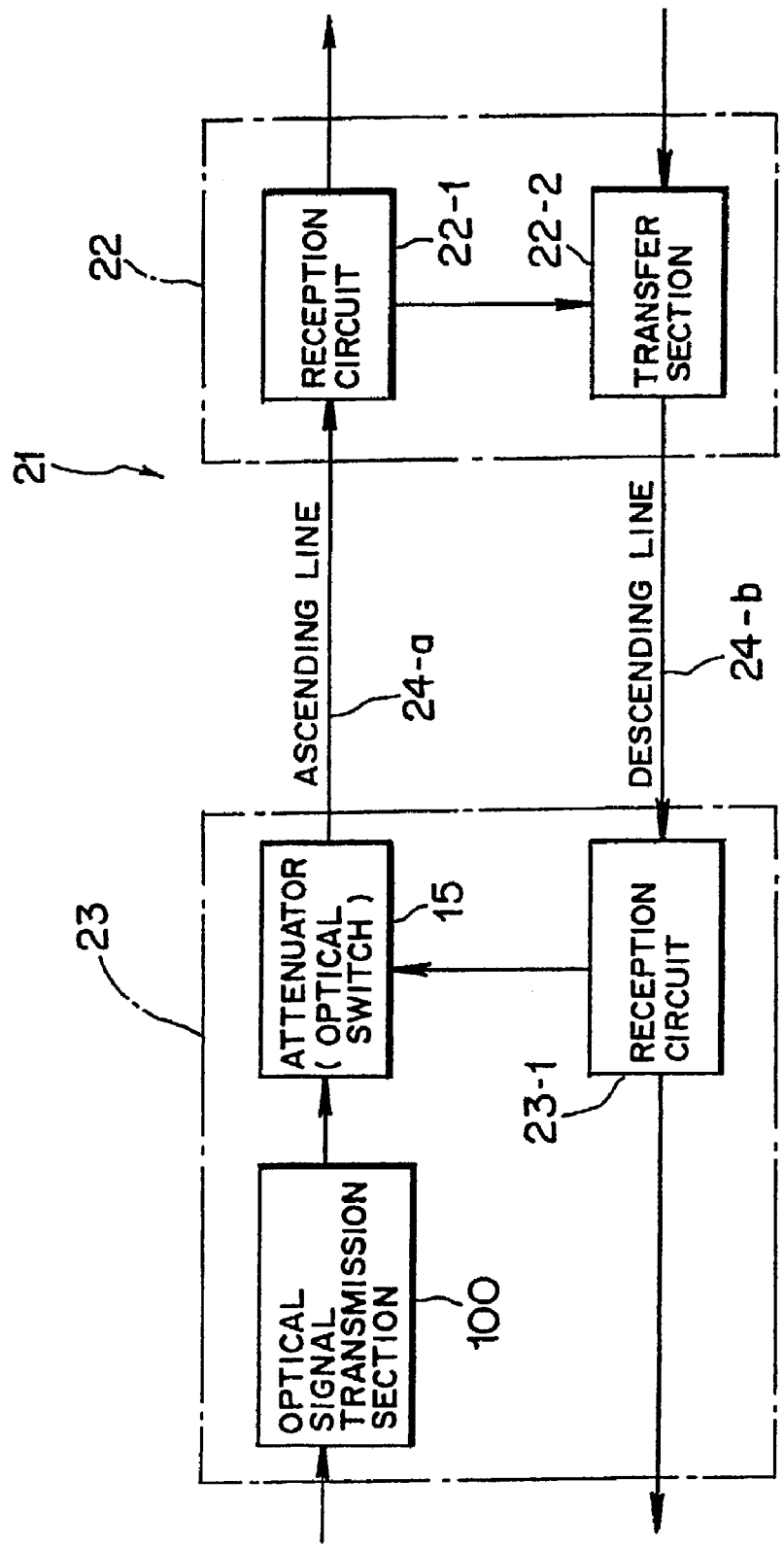
FIG. 26 is a block diagram showing a transmission system according to a modification to the ninth embodiment of the present invention.

The wavelength demultiplexing reception apparatus 900 according to the ninth embodiment described above may additionally include a transfer section 22-2 which transfers, when a wavelength abnormal condition is detected, such abnormal condition information to the transmission side as seen in FIG. 26.

FIG. 26 shows in block diagram a system 21 which transmits a wavelength multiplex signal. Referring to FIG. 26, the transmission system 21 includes a reception apparatus 22 which has the functions of the wavelength demultiplexing reception apparatus 900 described above, a transmission apparatus 23, an ascending line 24-a and a descending line 24-b.

The reception apparatus 22 includes a WDM branching filter 19 serving as a reception circuit 22-1 for receiving a wavelength multiplex signal, and a transfer section 22-2.

The filter control section 19b-n of the WDM branching filter 19 outputs, when it detects a wavelength displacement based on information of a control voltage, the detection information to the transfer section 22-2.

The transfer section 22-2 transmits wavelength abnormal condition information as an overhead bit in transmission data or another wavelength signal by wavelength multiplexing to the transmission apparatus 23.

The transmission apparatus 23 includes the optical signal transmission section 100 (or one of the optical signal transmission sections 100 to 700) described hereinabove, an attenuator 15, and a reception circuit 23-1. It is to be noted that an optical switch having a function similar to the attenuator 15 may be provided in place of the attenuator 15.

The reception circuit 23-1 supervises whether or not a signal outputted from the reception apparatus 22 includes wavelength abnormal condition information. Here, if the output signal of the reception apparatus 22 is a wavelength multiplex signal, then the WDM branching filter 19 can be used similarly as in the reception circuit 22-1, and in this instance, the WDM branching filter 19 has a function of supervising whether or not data of signals demultiplexed for a plurality of different wavelengths include wavelength abnormal condition information. The wavelength abnormal condition information is sent to the transmission apparatus 23 while it is included in a signal of one predetermined wavelength or in signals of a plurality of different wavelengths.

The transfer section 22-2 of the reception apparatus 22 according to the modification to the ninth embodiment having the construction described above inserts wavelength abnormal condition information into an overhead bit of a main signal or the like and sends it to the transmission side using the descending line 24-b opposite to the ascending line 24-a along which data from the transmission apparatus 23 is transmitted.

When the wavelength abnormal condition information is received by the reception circuit 23-1, this is outputted to the attenuator 15 or the like. Consequently, the attenuator 15 or the like shuts down (interrupts) outputting of an optical signal from the optical signal outputting section.

In this manner, with the reception apparatus 22 according to the modification to the ninth embodiment of the present invention, since, when a wavelength abnormal condition is detected on the reception side, due to the provision of the transfer section 22-2, the abnormal condition information can be transmitted to the transmission side, crosstalk with another channel can be prevented, and consequently, a countermeasure against the abnormal condition can be taken immediately.

The transfer section 22-2 which transfers such wavelength abnormal condition information to the transmission side can be used also when a wavelength abnormal condition is detected by the wavelength demultiplexing reception apparatus 800 according to the eighth embodiment described above.

j. OTHERS

While the embodiments of the present invention are described in detail in a. to i1. above, the present invention is not limited to the specific embodiments described above and the apparatus described above can be altered or modified in various manners within the spirit or scope of the present invention as defined by the appended claims.

What is claimed is:

1. A wavelength multiplexing transmission apparatus, comprising:
    a plurality of optical signal outputting sections outputting optical signals having wavelengths different from each other; and
    a wavelength multiplexing section wavelength multiplexing the optical signals outputted from said optical signal outputting sections and sending out a resulting optical signal;
    each of said optical signal outputting sections including:
        a transmission light source outputting an optical signal in accordance with an electric driving signal inputted;
        a driving signal source outputting the electric driving signal to said transmission light source of which a level is controlled to be stabilized at a reference level so that said transmission light source may output an optical signal with a predetermined wavelength; and
        an abnormal condition detecting section detecting an abnormal condition of the electric driving signal which is to be inputted to said transmission light source based on the level of the electric driving signal from said driving signal source.

2. A wavelength multiplexing transmission apparatus as claimed in claim 1, wherein, when an abnormal condition of said light source module or said transmission light source is detected, the optical signal to be outputted from the optical signal outputting section to said wavelength multiplexing section is switched into an interruption condition.

3. A wavelength multiplexing transmission apparatus as claimed in claim 1, wherein, said abnormal condition detection section further comprises:
    a detector discriminating whether or not a current value of the inputted electric driving signal is at a level within a normal range based on a first and second reference value set in advance.

* * * * *